(12) United States Patent
Zhou et al.

(10) Patent No.: US 11,053,129 B2
(45) Date of Patent: Jul. 6, 2021

(54) MAGNESIUM MODIFIED Y-TYPE MOLECULAR SIEVE, PREPARATION THEREOF AND CATALYST COMPRISING THE SAME

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Lingping Zhou, Beijing (CN); Weilin Zhang, Beijing (CN); Mingde Xu, Beijing (CN); Zhenyu Chen, Beijing (CN); Huiping Tian, Beijing (CN); Yuxia Zhu, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 45 days.

(21) Appl. No.: 16/484,880

(22) PCT Filed: Feb. 12, 2018

(86) PCT No.: PCT/CN2018/076431
§ 371 (c)(1),
(2) Date: Aug. 9, 2019

(87) PCT Pub. No.: WO2018/153303
PCT Pub. Date: Aug. 30, 2018

(65) Prior Publication Data
US 2019/0375646 A1 Dec. 12, 2019

(30) Foreign Application Priority Data

Feb. 21, 2017 (CN) .......................... 201710093368.0
Feb. 21, 2017 (CN) .......................... 201710093369.5
Feb. 22, 2017 (CN) .......................... 201710097151.7

(51) Int. Cl.
| | | |
|---|---|---|
| *C01B 39/24* | (2006.01) | |
| *B01J 29/08* | (2006.01) | |
| *C10G 11/05* | (2006.01) | |
| *C01B 39/02* | (2006.01) | |
| *B01J 35/10* | (2006.01) | |
| *B01J 37/30* | (2006.01) | |

(52) U.S. Cl.
CPC .............. *C01B 39/24* (2013.01); *B01J 29/084* (2013.01); *B01J 29/088* (2013.01); *B01J 35/1038* (2013.01); *B01J 35/1061* (2013.01); *B01J 35/1066* (2013.01); *B01J 37/30* (2013.01); *C01B 39/023* (2013.01); *C10G 11/05* (2013.01); *B01J 2229/16* (2013.01); *B01J 2229/183* (2013.01); *B01J 2229/186* (2013.01); *B01J 2229/24* (2013.01); *B01J 2229/32* (2013.01); *B01J 2229/36* (2013.01); *B01J 2229/42* (2013.01); *C01P 2006/14* (2013.01); *C01P 2006/17* (2013.01); *C01P 2006/37* (2013.01)

(58) Field of Classification Search
CPC .. C01B 39/24; C01P 2006/14; C01P 2006/17; C01P 2006/37; B01J 29/088; B01J 35/042; B01J 35/1038; B01J 2229/32; B01J 2229/36; B01J 2229/42; B01J 35/1061; B01J 35/1066; B01J 37/30; B01J 2229/16; B01J 2229/186; B01J 2229/24; C10G 11/05
See application file for complete search history.

(56) References Cited

U.S. PATENT DOCUMENTS

| | | |
|---|---|---|
| 4,273,753 A | 6/1981 | Chang |
| 4,429,053 A | 1/1984 | Ward |
| 4,438,178 A | 3/1984 | Powers |

(Continued)

FOREIGN PATENT DOCUMENTS

| | | |
|---|---|---|
| CN | 1098130 A | 2/1995 |
| CN | 1194941 A | 10/1998 |

(Continued)

OTHER PUBLICATIONS

Jianhui Zhao et al., "Study on Chemical Modification of Ultra-stable Y Molecular Sieve", QILU Petrochemical Technology, 2000, vol. 28, No. 1, pp. 36-39.

(Continued)

*Primary Examiner* — David M Brunsman
(74) *Attorney, Agent, or Firm* — Novick, Kim & Lee, PLLC; Allen Xue

(57) ABSTRACT

A magnesium modified Y-type molecular sieve has a rare earth oxide content of about 4% to about 11% by weight, a magnesium oxide content of about 0.1% to about 4% by weight, a sodium oxide content of about 0.3% to about 0.8% by weight, a total pore volume of about 0.33 mL/g to about 0.39 mL/g, a percentage of the pore volume of secondary pores having a pore size of 2-100 nm to the total pore volume of the modified Y-type molecular sieve of about 10% to about 30%, a lattice constant of about 2.440 nm to about 2.455 nm, a percentage of non-framework aluminum content to the total aluminum content of the modified Y-type molecular sieve of no more than about 20%, and a lattice collapse temperature of not lower than about 1045° C.

20 Claims, No Drawings

(56) References Cited

U.S. PATENT DOCUMENTS

| | | | |
|---|---|---|---|
| 4,584,287 A | 4/1986 | Ward | |
| 4,840,047 A * | 6/1989 | Richter | D21F 1/66 68/181 R |
| 5,206,194 A | 4/1993 | Clark | |
| 5,340,957 A | 8/1994 | Clark | |
| 9,840,422 B2 * | 12/2017 | Gao | B01J 29/084 |
| 9,993,811 B2 * | 6/2018 | Zhou | B01J 8/002 |
| 2004/0254060 A1 | 12/2004 | Du et al. | |
| 2013/0131419 A1 | 5/2013 | Buchanan et al. | |

FOREIGN PATENT DOCUMENTS

| | | |
|---|---|---|
| CN | 1296860 A | 5/2001 |
| CN | 1307087 A | 8/2001 |
| CN | 1362472 A | 8/2002 |
| CN | 1382525 A | 12/2002 |
| CN | 1382631 A | 12/2002 |
| CN | 1388064 A | 1/2003 |
| CN | 1132898 C | 12/2003 |
| CN | 1566273 A | 1/2005 |
| CN | 1683244 A | 10/2005 |
| CN | 1727442 A | 2/2006 |
| CN | 1727445 A | 2/2006 |
| CN | 1915485 A | 2/2007 |
| CN | 1915486 A | 2/2007 |
| CN | 1916116 A | 2/2007 |
| CN | 101081369 A | 12/2007 |
| CN | 101285001 A | 10/2008 |
| CN | 101745418 A | 6/2010 |
| CN | 103157506 A | 6/2013 |
| CN | 103159227 A | 6/2013 |
| WO | 2013086765 A1 | 6/2013 |

OTHER PUBLICATIONS

"Petrochemical Analysis Methods (RIPP Test Methods)", edited by Cuiding Yang et al., Science Press, Sep. 1990, First Edition, pp. 263-268, 412-415 and 424-426, ISBN: 7-03-001894-X.

* cited by examiner

1

MAGNESIUM MODIFIED Y-TYPE MOLECULAR SIEVE, PREPARATION THEREOF AND CATALYST COMPRISING THE SAME

TECHNICAL FIELD

The present application relates to a highly stable magnesium modified Y-type molecular sieve, preparation thereof and a catalyst comprising the same.

BACKGROUND ART

High-silica magnesium modified Y-type molecular sieve can be used for heavy oil conversion to increase diesel production. At present, the production of high-silica Y-type molecular sieves in the industry is mainly based on hydrothermal methods, in which a NaY zeolite is subjected to multiple rare earth ion-exchange and multiple high-temperature hydrothermal roasting to obtain a high-silica rare earth modified Y-type molecular sieve, which is also the most common method used for the preparation of high-silica Y molecular sieves. However, a disadvantage of hydrothermal method for the preparation of high-silica rare earth modified Y-type molecular sieves is that excessively severe conditions for the hydrothermal treatment will destroy the structure of the molecular sieve, and consequently Y-type molecular sieves with high silica-to-alumina ratio cannot be obtained; though the generation of non-framework aluminum may be beneficial to the improvement of the stability of the molecular sieve and the formation of new acid centers, too much non-framework aluminum may reduce the selectivity of the molecular sieve; in addition, many of the de-aluminized holes in the molecular sieve cannot be timely supplemented by the silicon migrated from the framework, which often causes lattice defects in the molecular sieve, so that the molecular sieve shows a low crystallinity retention. Therefore, high-silica rare earth modified Y-type molecular sieves prepared by the hydrothermal method may have a poor thermal and hydrothermal stability, which may manifest as a low lattice collapse temperature, as well as a low crystallinity retention and specific surface area retention after hydrothermal aging.

In the method disclosed in U.S. Pat. Nos. 4,584,287 and 4,429,053, the NaY zeolite is first subjected to rare earth ion-exchange and then subjected to steam treatment. In this method, it is difficult to remove aluminum from the molecular sieve during the steam treatment, due to the shielding effect and support of the rare earth ions. The lattice constant of the molecular sieve is increased to 2.465-2.475 nm before the steam treatment, and becomes 2.420-2.464 nm after the treatment, and a high temperature (593-733° C.) is required to reduce the lattice constant.

In the method disclosed in U.S. Pat. Nos. 5,340,957 and 5,206,194, the NaY zeolite raw material has a $SiO_2/Al_2O_3$ ratio of 6.0 and thus the production cost is relatively high. Further, in this method, the NaY is also first subjected to a rare earth ion-exchange, and then subjected to a hydrothermal treatment, and therefore this method also has the disadvantages of the aforementioned U.S. Pat. Nos. 4,584,287 and 4,429,053.

Gas phase chemical method is another important method for the preparation of high silica molecular sieves, which was first reported by Beyer and Mankui in 1980. In the gas phase chemical method, anhydrous NaY zeolite is generally reacted with $SiCl_4$ under nitrogen protection at a certain temperature. The reaction makes full use of the external Si provided by the $SiCl_4$, and the alumination removal and silicon supplementation are completed in a single stage by isomorphous substitution. U.S. Pat. Nos. 4,273,753, and 4,438,178, and Chinese Patent Application Publication Nos. CN1382525A, CN1194941A, and CN1683244A disclose a method for preparing an ultra-stable Y-type molecular sieve by gas phase chemical dealuminization using $SiCl_4$. However, the heavy oil cracking activity of existing gas phase ultra-stabilized molecular sieves is not high, and the prior art does not teach how to further improve the heavy oil cracking activity of gas phase ultra-stabilized molecular sieves.

In addition, the liquid phase Si—Al isomorphous substitution method using $(NH_4)_2SiF_6$ is also a common used method for the preparation of ultra-stable molecular sieves, of which the mechanism is to replace the Al atoms in the framework of the molecular sieve with Si in the $(NH_4)_2SiF_6$ in solution, so that an ultra-stable molecular sieve with an increased silica-alumina ratio can be produced. The Si—Al isomorphous substitution method using $(NH_4)_2SiF_6$ is characterized in that an ultra-stable molecular sieve with a framework $SiO_2/Al_2O_3$ molar ratio of 10-30 or higher can be produced, which has a high thermal stability, no non-framework aluminum or $Al_2O_3$ fragments, and a high relative crystallinity. However, due to the diffusion problem, the dealumination with $(NH_4)_2SiF_6$ is nonuniform and may cause a deficiency of surface Al, which is called "surface enrichment of silicon". In addition, the insoluble substance $AlF_3$ generated during the dealumination with $(NH_4)_2SiF_6$ and the residual fluorosilicate may affect the hydrothermal stability of the molecular sieve, $(NH_4)_2SiF_6$ may cause an environmental pollution, and the ultra-stable molecular sieve obtained lacks secondary pores.

Therefore, existing high-silica magnesium modified Y-type molecular sieve has low cracking activity for heavy oils and low diesel selectivity.

SUMMARY OF THE INVENTION

An object of the present application is to provide a highly stable magnesium modified Y-type molecular sieve suitable for catalytic cracking of heavy oils, preparation thereof and a catalyst comprising the same. The modified Y-type molecular sieve shows higher cracking activity for heavy oils and better diesel selectivity.

In an aspect, the present application provides a magnesium modified Y-type molecular sieve, having a rare earth oxide content of about 4% to about 11% by weight, a magnesium oxide content of about 0.1% to about 4% by weight, a sodium oxide content of about 0.3% to about 0.8% by weight, a total pore volume of about 0.33 mL/g to about 0.39 mL/g, a percentage of the pore volume of secondary pores having a pore size of 2-100 nm to the total pore volume of the modified Y-type molecular sieve of about 10% to about 30%, a lattice constant of about 2.440 nm to about 2.455 nm, a percentage of non-framework aluminum content to the total aluminum content of the modified Y-type molecular sieve of no more than about 20%, and a lattice collapse temperature of not lower than about 1045° C.

In another aspect, the present application provides a method for the preparation of a magnesium modified Y-type molecular sieve, comprising the steps of:

(1) contacting a NaY molecular sieve with a rare earth salt solution for ion-exchange reaction, to obtain a rare earth modified Y-type molecular sieve having a reduced sodium oxide content;

(2) subjecting the Y-type molecular sieve obtained in the step (1) to roasting at a temperature of about 350-480° C. in an atmosphere containing about 30 vol % to about 90 vol % of steam for about 4.5 hours to about 7 hours, to obtain a Y-type molecular sieve having a reduced lattice constant;

(3) contacting and reacting the Y-type molecular sieve obtained in the step (2) with gaseous silicon tetrachloride under the following conditions: a weight ratio of $SiCl_4$:the Y-type molecular sieve on a dry basis of about 0.1:1 to about 0.7:1, a reaction temperature of about 200° C. to about 650° C., and a reaction time of about 10 minutes to about 5 hours, to obtain a high-silica ultra-stable Y-type molecular sieve;

(4) subjecting the high-silica ultra-stable Y-type molecular sieve obtained in the step (3) to modification with a magnesium compound, to obtain the magnesium modified Y-type molecular sieve.

In a further aspect, the present application provides a catalytic cracking catalyst comprising the modified Y-type molecular sieve according to the present application or a modified Y-type molecular sieve obtained by the method according to the present application.

In a preferred embodiment, the catalyst comprises, based on the weight of the catalyst, from about 10% to about 50% by weight on a dry basis of the modified Y-type molecular sieve, and from about 10% to about 40% by weight, on the basis of alumina, of an alumina binder, and about 10% to about 80% by weight, on a dry basis, of clay.

In a preferred embodiment, the catalyst comprises, based on the weight of the catalyst, from about 10% to about 50% by weight on a dry basis of the modified Y-type molecular sieve, from about 2% to about 40% by weight, on a dry basis, of an additive-containing alumina, and about 10% to about 80% by weight, on a dry basis, of clay; wherein the additive-containing alumina comprises, on a dry basis and based on the weight of the additive-containing alumina, about 60% to about 99.5% by weight of alumina and about 0.5% to about 40% by weight of an additive that is one or more selected from the group consisting of compounds containing alkaline earth metal, lanthanide metal, silicon, gallium, boron and/or phosphorus.

The magnesium modified Y-type molecular sieve provided in the present application has a high thermal and hydrothermal stability, and shows higher heavy oil conversion activity, lower coke selectivity, and higher diesel oil yield, light oil yield and total liquid yield as compared to existing Y-type molecular sieves, when used for catalytic cracking of heavy oils.

The method for the preparation of a magnesium modified Y-type molecular sieve provided in the present application can be used to produce a high-silica ultra-stable magnesium modified Y-type molecular sieve having a certain amount of secondary pores, high crystallinity, high thermal stability and high hydrothermal stability, which has a uniform distribution of aluminum, and a low non-framework aluminum content. When used for catalytic cracking of heavy oils, the Y-type molecular sieve shows a good coke selectivity, a high cracking activity for heavy oils, and an improved diesel oil yield, light oil yield and total liquid yield.

The modified Y-type molecular sieve provided in the present application can be used as an active component of a catalytic cracking catalyst for the conversion of heavy oils or inferior oils. The catalytic cracking catalyst comprising the molecular sieve as the active component shows strong conversion capacity for heavy oils, high stability, good coke selectivity and high light oil yield and diesel oil yield.

The catalytic cracking catalyst provided in the present application has higher activity and hydrothermal stability, and shows higher heavy oil conversion activity, lower coke selectivity, higher diesel oil yield, and higher light oil yield and total liquid yield as compared to existing cracking catalysts based on magnesium modified Y-type molecular sieves, when used for catalytic cracking of heavy oils.

The catalyst according to the present application is suitable for catalytic cracking of various hydrocarbon oils, and is especially suitable for catalytic cracking of heavy oils. For example, the hydrocarbon oils include, but limited to, atmospheric residue, vacuum residue, vacuum gas oil, atmospheric gas oil, straight-run gas oil, light/heavy propane deasphalted oil, and coker gas oil.

DETAILED DESCRIPTION OF THE INVENTION

The embodiments of the present application will be described in detail below. It is to be understood that the embodiments described herein are merely illustrative and not restrictive.

Any numerical value (including the end values of numerical ranges) provided herein is not limited to the precise value recited, but should be interpreted as covering any value close to said precise value. Moreover, for any numerical range provided herein, one or more new numerical ranges can be obtained by arbitrarily combining the end values of the range, an end value with a specific value provided within the range, or various specific values provided within the range. Such new numerical ranges should also be considered as being specifically disclosed herein.

The RIPP test methods involved in the present application can be found in "Petrochemical Analysis Methods (RIPP Test Methods)", edited by Cuiding YANG et al., Science Press, September 1990, First Edition, pages 263-268, 412-415 and 424-426, ISBN: 7-03-001894-X, which is incorporated herein by reference in its entirety.

All patent and non-patent literatures mentioned herein, including but not limited to textbooks and journal articles, are hereby incorporated by reference in their entirety.

As used herein, the terms "Y-type molecular sieve" and "Y-type zeolite" are used interchangeably, and the terms "NaY molecular sieve" and "NaY zeolite" are also used interchangeably.

As used herein, the term "secondary pores" refers to the pores having a pore size (i.e. pore diameter) of from 2 nm to 100 nm in the molecular sieve.

As used herein, the term "inorganic acid having a medium or higher strength" refers to an inorganic acid having an acid strength not lower than that of $HNO_2$ (nitrous acid), including but not limited to $HClO_4$ (perchloric acid), HI (hydrogen iodide), HBr (hydrobromic acid), HCl (hydrochloric acid), $HNO_3$ (nitric acid), $H_2SeO_4$ (selenic acid), $H_2SO_4$ (sulfuric acid), $HClO_3$ (chloric acid), $H_2SO_3$ (sulfuric acid), $H_3PO_3$ (phosphoric acid), and $HNO_2$ (nitrous acid), and the like.

As used herein, the terms "rare earth solution" and "rare earth salt solution" are used interchangeably, and are preferably an aqueous solution of a rare earth salt.

As used herein, the expression "Y-type molecular sieve having a normal lattice constant" means that the lattice constant of the Y-type molecular sieve is within the range of the lattice constant of conventional NaY molecular sieves, which is preferably in a range of about 2.465 nm to about 2.472 nm.

As used herein, the term "atmospheric pressure" means a pressure of about 1 atm.

As used herein, the weight, on a dry basis, of a material refers to the weight of the solid product obtained after calcining the material at 800° C. for 1 hour.

In a first aspect, the present application provides a magnesium modified Y-type molecular sieve, having a rare earth oxide content of about 4% to about 11% by weight, a magnesium oxide content of about 0.1% to about 4% by weight, a sodium oxide content of about 0.3% to about 0.8% by weight, a total pore volume of about 0.33 mL/g to about 0.39 mL/g, a percentage of the pore volume of secondary pores having a pore size of 2-100 nm to the total pore volume of the modified Y-type molecular sieve of about 10% to about 30%, a lattice constant of about 2.440 nm to about 2.455 nm, a percentage of non-framework aluminum content to the total aluminum content of the modified Y-type molecular sieve of no more than about 20%, and a lattice collapse temperature of not lower than about 1045° C.

In a preferred embodiment, the modified Y-type molecular sieve provided in the present application has a lattice collapse temperature of not lower than about 1045° C. Preferably, the modified Y-type molecular sieve has a lattice collapse temperature of about 1045-1075° C., for example, about 1050-1070° C.

In a preferred embodiment, the modified Y-type molecular sieve provided in the present application has a magnesium oxide content of from about 0.5% to about 3% by weight.

In a preferred embodiment, the modified Y-type molecular sieve provided in the present application has a lattice constant of about 2.440-2.455 nm, for example, 2.441-2.453 nm or 2.442-2.451 nm.

In a preferred embodiment, the modified Y-type molecular sieve provided in the present application is a high-silica Y-type molecular sieve having a framework silica-alumina ratio ($SiO_2/Al_2O_3$ molar ratio) of about 7.3-14, for example about 7.8-13.2 or about 8.5-12.6.

In a preferred embodiment, the modified Y-type molecular sieve provided in the present application has a percentage of non-framework aluminum content to the total aluminum content of no more than about 20%, for example, about 13-19% by weight.

In a preferred embodiment, the modified Y-type molecular sieve provided in the present application has a crystallinity retention of about 30% or more, for example, about 30-45%, about 32-40%, about 35-44% or about 38-43%, after aging at 800° C. under atmospheric pressure in 100 vol % steam atmosphere for 17 hours.

In a preferred embodiment, the modified Y-type molecular sieve provided in the present application has a relative crystallinity of not less than about 55%. Preferably, the modified Y-type molecular sieve has a relative crystallinity of about 55-68%, for example, about 58-66%.

In a preferred embodiment, the modified Y-type molecular sieve provided in the present application has a specific surface area of about 600-670 $m^2/g$, for example about 610-660 $m^2/g$, about 620-655 $m^2/g$ or about 630-650 $m^2/g$.

In a preferred embodiment, the modified Y-type molecular sieve provided in the present application has a total pore volume of from about 0.33 mL/g to about 0.39 mL/g, for example from about 0.35 mL/g to about 0.39 mL/g or from about 0.35 mL/g to about 0.37 mL/g.

In a preferred embodiment, the modified Y-type molecular sieve provided in the present application has a percentage of the pore volume of secondary pores having a pore size of 2.0-100 nm to the total pore volume of about 10-30%, for example, about 15-25%, about 17-22% or about 20-28%.

In a preferred embodiment, the modified Y-type molecular sieve provided in the present application has a rare earth oxide content of from about 4% to about 11% by weight, preferably from about 4.5% to about 10% by weight, for example from about 5% to about 9% by weight, on the basis of $RE_2O_3$.

In a preferred embodiment, the modified Y-type molecular sieve provided in the present application has a sodium oxide content of no more than about 0.8% by weight, which may be from about 0.3% to about 0.8% by weight, such as from about 0.5% to about 0.80% by weight or from about 0.4% to about 0.6% by weight.

In certain preferred embodiments, the modified Y-type molecular sieve provided in the present application has a rare earth oxide content of from about 4% to about 11% by weight, preferably from about 4.5% to about 10% by weight; a magnesium oxide content of from about 0.1% to about 4% by weight, for example about 0.5-3 wt %; a sodium oxide content of about 0.3-0.8 wt %, preferably about 0.35-0.75 wt %, for example about 0.4-0.6 wt %; a total pore volume of about 0.33-0.39 mL/g, a percentage of the pore volume of secondary pores having a pore size of 2-100 nm to the total pore volume of about 10-30%, preferably about 15-25%; a lattice constant of about 2.440-2.455 nm, a framework silica-alumina ratio ($SiO_2/Al_2O_3$ molar ratio) of about 7-14, a percentage of non-framework aluminum content to the total aluminum content of the molecular sieve of no more than about 20%, preferably about 13-19%, a relative crystallinity of not less than about 55%, for example, about 55-68%, a lattice collapse temperature of about 1045-1075° C., for example about 1047-1065° C.

In a preferred embodiment, the preparation of the modified Y-type molecular sieve provided in the present application comprises the step of contacting the Y-type molecular sieve with silicon tetrachloride for Si—Al isomorphous substitution reaction.

In certain embodiments, the modified Y-type molecular sieve provided in the present application does not show a "surface enrichment of silicon", but shows a ratio of surface $SiO_2/Al_2O_3$ molar ratio to framework $SiO_2/Al_2O_3$ molar ratio of less than or equal to 1, typically less than 1.

In a second aspect, the present application provides a method for the preparation of a magnesium modified Y-type molecular sieve, comprising the steps of:

(1) contacting a NaY molecular sieve with a rare earth solution for ion-exchange reaction, to obtain a rare earth modified Y-type molecular sieve having a reduced sodium oxide content;

(2) subjecting the Y-type molecular sieve obtained in the step (1) to roasting at a temperature of about 350-480° C. in an atmosphere containing about 30 vol % to about 90 vol % of steam (also referred to as 30-90 vol % steam atmosphere or 30-90% steam) for about 4.5 hours to about 7 hours, to obtain a Y-type molecular sieve having a reduced lattice constant;

(3) contacting and reacting the Y-type molecular sieve obtained in the step (2) with gaseous $SiCl_4$ at a temperature of about 200° C. to about 650° C., and preferably at a weight ratio of $SiCl_4$:the Y-type molecular sieve on a dry basis of about 0.1:1 to about 0.7:1, for a reaction time of about 10 minutes to about 5 hours; and (4) subjecting the ultra-stabilized Y-type molecular sieve obtained in the step (3) to magnesium modification by contacting with a magnesium compound, to obtain the magnesium modified Y-type molecular sieve.

In some preferred embodiments, in the step (1) of the method for the preparation of modified Y-type molecular sieves provided in the present application, an ion-exchange reaction between a NaY molecular sieve and a rare earth solution is conducted to obtain a rare earth modified Y-type molecular sieve having a normal lattice constant and a reduced sodium oxide content. The NaY molecular sieve is either commercially available or prepared according to existing methods. In a preferred embodiment, the NaY molecular sieve has a lattice constant of about 2.465-2.472 nm, a framework silica-alumina ratio ($SiO_2/Al_2O_3$ molar ratio) of about 4.5-5.2, a relative crystallinity of about 85% or more, for example, about 85-95%, and a sodium oxide content of about 13.0-13.8 wt %.

In a preferred embodiment, the NaY molecular sieve is subjected to an ion-exchange reaction with a rare earth solution in the step (1) at an ion-exchange temperature of preferably about 15-95° C., for example, about 65-95° C.; for an ion-exchange time of preferably about 30-120 minutes, for example about 45-90 minutes; at a weight ratio of NaY molecular sieve (on a dry basis):rare earth salt (on the basis of $RE_2O_3$):$H_2O$ of about 1:0.01-0.18:5-15.

In a preferred embodiment, the NaY molecular sieve is subjected to an ion-exchange reaction with the rare earth solution by mixing the NaY molecular sieve, the rare earth salt and water at a weight ratio of the NaY molecular sieve:the rare earth salt:$H_2O$ of about 1:0.01-0.18:5-15 to form a mixture, and stirring at a temperature of about 15-95° C., for example, about 65-95° C., preferably for about 30-120 minutes to conduct an exchange between rare earth ions and sodium ions.

In a preferred embodiment, the mixture of the NaY molecular sieve, the rare earth salt and water can be formed by mixing the NaY molecular sieve and water to form a slurry, and then adding to the slurry the rare earth salt and/or an aqueous solution of the rare earth salt. The rare earth solution can be a solution of the rare earth salt. The rare earth salt is preferably a rare earth chloride and/or a rare earth nitrate. The rare earth is, for example, one or more of La, Ce, Pr, Nd and mixed rare earths. Preferably, the mixed rare earth comprises one or more of La, Ce, Pr and Nd, or further comprises at least one of rare earths other than La, Ce, Pr, and Nd.

In a preferred embodiment, step (1) further comprises a washing step for the purpose of washing away the exchanged sodium ions, for example, using deionized water or decationized water.

In a preferred embodiment, the rare earth modified Y-type molecular sieve having a normal lattice constant and a reduced sodium oxide content obtained in the step (1) has a rare earth content, on the basis of $RE_2O_3$, of about 4.5-13% by weight, for example, about 5.5-13% by weight or about 5.5-12% by weight, a sodium oxide content of no more than about 9.5% by weight, for example about 5.5-9.5% by weight, and a lattice constant of about 2.465-2.472 nm.

In certain preferred embodiments, in the step (2) of the method for the preparation of modified Y-type molecular sieves provided in the present application, the rare earth modified Y-type molecular sieve having a normal lattice constant is subjected to a treatment at a temperature of about 350° C. to about 520° C., in an atmosphere containing about 30% to about 90% by volume of steam, for about 4.5-7 hours.

In a preferred embodiment, in the step (2), the roasting temperature is about 380-460° C., the roasting atmosphere contains about 40-80 vol % of steam, and the roasting time is about 5-6 hours.

In a preferred embodiment, the steam atmosphere contains from about 30% to about 90% by volume of steam, and further comprises other gas(es), such as one or more of air, helium or nitrogen.

In a preferred embodiment, the Y-type molecular sieve having a reduced lattice constant obtained in the step (2) has a lattice constant of about 2.450 nm to about 2.462 nm.

In a preferred embodiment, the Y-type molecular sieve obtained in the step (2) has a water content of no more than about 1% by weight, which is directly used in the reaction of the step (3).

In another preferred embodiment, the step (2) further comprises the step of drying the roasted Y-type molecular sieve to obtain a water content of no more than about 1% by weight.

In a preferred embodiment, the Y-type molecular sieve having a reduced lattice constant obtained in the step (2) has a solid content of no less than about 99% by weight.

In a preferred embodiment, the step (2) may optionally further comprise washing, filtering and drying, and optionally further comprise contacting with an acid solution for channel cleaning, to obtain an ultra-stable modified Y-type molecular sieve.

In some preferred embodiments, in the step (3) of the method for the preparation of a modified Y-type molecular sieve provided in the present application, the weight ratio of $SiCl_4$ to the Y-type molecular sieve (on a dry basis) is preferably about 0.3-0.6:1, and the reaction temperature is preferably from about 350° C. to about 500° C.

In a preferred embodiment, the step (3) may further comprise a washing step, which may be carried out by a conventional washing method, using water such as deionized water or decationized water, for the purpose of removing soluble by-products such as $Na^+$, $Cl^-$, $Al^{3+}$ and the like remaining in the molecular sieve. For example, the washing conditions may include: a weight ratio of the washing water to the molecular sieve of about 5-20:1, usually a weight ratio of the molecular sieve:$H_2O$ of about 1:6-15, a pH of preferably about 2.5-5.0, and a washing temperature of about 30-60° C. Preferably, the washing is carried out to the extent that no free ions like $Na^+$, $Cl^-$ and $Al^{3+}$ can be detected in the spent washing liquid, and the content of each of the $Na^+$, $Cl^-$ and $Al^{3+}$ ions in the molecular sieve after washing is not more than about 0.05% by weight.

In a preferred embodiment, in the step (3) of the method for the preparation of modified Y-type molecular sieves provided in the present application, the gas phase ultra-stabilized Y-type molecular sieve obtained is contacted and reacted with an acid solution (which is referred to hereinafter as channel cleaning modification, or channel cleaning for short, or referred to as acid treatment modification).

In a further preferred embodiment, said contacting and reacting the gas phase ultra-stabilized Y-type molecular sieve with an acid solution is carried out by mixing the molecular sieve treated by gas phase ultra-stablization modification, i.e. the gas phase ultra-stablized Y-type molecular sieve, with the acid solution and reacting for a period of time, and then separating the molecular sieve after the reaction from the acid solution, for example, by filtration, and subjecting it optionally to washing (which is used to remove soluble by-products, such as $Na^+$, $Cl^-$, $Al^{3+}$, and the like, remaining in the molecular sieve, for example, under the following washing conditions: a weight ratio of the washing water to the molecular sieve of about 5-20:1, usually a weight ratio of the molecular sieve:$H_2O$ of about 1:6-15, a pH of preferably about 2.5-5.0, and a washing temperature of about 30-60° C.) and optionally to drying, to obtain the modified Y-type molecular sieve provided in the present application.

In a further preferred embodiment, the gas phase ultra-stabilized Y-type molecular sieve obtained in the step (3) is contacted with the acid solution at a weight ratio of the acid to the molecular sieve (on a dry basis) of about 0.001-0.15:1, for example about 0.002-0.1:1 or 0.01-0.05:1, a weight ratio of water to the molecular sieve on a dry basis of about 5-20:1, for example about 8-15:1, and a reaction temperature of about 60-100° C., for example about 80-99° C., preferably about 88-98° C.

In a preferred embodiment, the acid in the acid solution (an aqueous acid solution) is at least one organic acid and at least one inorganic acid having a medium or higher strength. The organic acid may be one or more of oxalic acid, malonic acid, butanedioic acid (succinic acid), methyl succinic acid, malic acid, tartaric acid, citric acid, and salicylic acid. The inorganic acid having a medium or higher strength may be one or more of phosphoric acid, hydrochloric acid, nitric acid, and sulfuric acid.

In a preferred embodiment, the channel cleaning modification is carried out at a temperature of about 80-99° C., for example 85-98° C., for a period of about 60 minutes or more, for example about 60-240 minutes or about 90-180 minutes. The weight ratio of the organic acid to the molecular sieve is about 0.01-0.10:1, for example, about 0.03-0.1:1 or 0.02-0.05:1; the weight ratio of the inorganic acid having a medium or higher strength to the molecular sieve is about 0.01-0.06:1, for example about 0.01-0.05:1 or 0.02-0.05:1, and the weight ratio of water to the molecular sieve is preferably from about 5:1 to about 20:1, for example from about 8:1 to about 15:1.

In a preferred embodiment, the channel cleaning modification is carried out in two stages, in which the molecular sieve is firstly contacted with an inorganic acid having a medium or higher strength, wherein the weight ratio of the inorganic acid having a medium or higher strength to the molecular sieve is about 0.01-0.05:1, for example about 0.02-0.05:1, the weight ratio of water to the molecular sieve is preferably about 5-20:1, for example about 8-15:1, the reaction temperature is about 80-99° C., preferably 90-98° C., and the reaction time is about 60-120 minutes; and then the molecular sieve obtained after the treatment is contacted with an organic acid, wherein the weight ratio of the organic acid to the molecular sieve is about 0.02-0.1:1, for example, about 0.02-0.10:1 or 0.05-0.08:1, the weight ratio of water to the molecular sieve is preferably from about 5:1 to about 20:1, for example from about 8:1 to about 15:1, the reaction temperature is from about 80° C. to about 99° C., preferably from about 90° C. to about 98° C., and the reaction time is about 60-120 minutes, wherein the weight ratio is calculated using the weight of the molecular sieve on a dry basis.

In some preferred embodiments, the step (4) of the method for the preparation of a modified Y-type molecular sieve provided in the present application comprises subjecting the ultra-stabilized Y-type molecular sieve obtained in the step (3) to magnesium modification with a magnesium compound. In a preferred embodiment, the ultra-stabilized Y-type molecular sieve filter cake obtained in the step (3) is directly added or added after being dried to a solution containing a magnesium compound such as a magnesium salt, and stirred at about 5-50° C. for about 10-120 minutes; then, ammonia water is added, the pH of the solution is adjusted to about 7.5-10, and the mixture is stirred evenly, filtered, and rinsed with neutral water; after that, the filter cake is dried, then placed in a muffle furnace at about 500-650° C., and calcined for about 1 hour or more, for example about 1-5 hours or about 2-3 hours, to obtain a high-silica magnesium modified ultra-stable Y molecular sieve. The magnesium compound solution and the molecular sieve are used in an amount such that the weight ratio of water to the molecular sieve (on a dry basis) is about 1-6, preferably about 1.5-3.5, the weight ratio of magnesium (calculated on the basis of magnesium oxide) to the molecular sieve (on a dry basis) is from about 0.001 to about 0.04, preferably from about 0.005 to about 0.035; preferably, the magnesium salt is magnesium chloride and/or magnesium nitrate.

In a preferred embodiment, the method for the preparation of a modified Y-type molecular sieve provided in the present application comprises the following steps:

(1) subjecting the NaY molecular sieve to ion-exchange reaction with a rare earth solution, filtering, and washing to obtain a rare earth modified Y-type molecular sieve having a normal lattice constant and a reduced sodium oxide content; wherein the ion-exchange is usually carried out under stirring at a temperature of about 15-95° C., preferably about 65-95° C., for about 30-120 minutes;

(2) subjecting the rare earth modified Y-type molecular sieve having a normal lattice constant and a reduced sodium oxide content to roasting at a temperature of about 350-480° C. in an atmosphere containing about 30 to 90% by volume of steam for about 4.5-7 hours, and drying, to obtain a Y-type molecular sieve having a reduced lattice constant and a water content of less than about 1% by weight, wherein the lattice constant of the Y-type molecular sieve having a reduced lattice constant is about 2.450-2.462 nm;

(3) contacting and reacting the Y-type molecular sieve having a reduced lattice constant and a water content of less than about 1% by weight with gaseous $SiCl_4$ vaporized by heat at a weight ratio of $SiCl_4$:the molecular sieve (on a dry basis) of about 0.1:1 to about 0.7:1, and a temperature of about 200° C. to about 650° C. for about 10 minutes to about 5 hours, optionally conducting a channel cleaning, washing and filtering, to obtain a gas phase ultra-stabilized Y-type molecular sieve filter cake;

(4) mixing the gas phase ultra-stabilized Y-type molecular sieve filter cake obtained in the step (3) with an aqueous magnesium salt solution, stirring at about 5-50° C. for about 10-120 minutes; and then adding ammonia water to adjust the pH of the solution to about 7.5-10, stirring evenly, filtered, and rinsed with neutral water; subjecting the filter cake to drying, and then to calcining at about 500-650° C. for 1-3 hours, to obtain a high-silica ultra-stable magnesium-modified Y-type molecular sieve; wherein in the mixture formed by the aqueous magnesium salt solution and the gas phase ultra-stabilized Y-type molecular sieve, the weight ratio of water to the molecular sieve is about 1-6, preferably about 1.5-3.5, and the weight ratio of magnesium (calculated on the basis of magnesium oxide) to the molecular sieve is about 0.001 to 0.04, preferably about 0.005 to 0.035.

In a third aspect, the present application provides a catalytic cracking catalyst comprising the modified Y-type molecular sieve according to the present application or a modified Y-type molecular sieve obtained by the method according to the present application.

In certain preferred embodiments, the catalytic cracking catalyst provided in the present application comprises, based on the weight of the catalyst, from about 10% to about 50% by weight on a dry basis of the modified Y-type molecular sieve, about 10% to about 40% by weight on the basis of alumina of an alumina binder, and from about 10% to about 80% by weight on a dry basis of clay.

In a preferred embodiment, the alumina binder is one or more selected from the group consisting of the various forms of alumina, hydrated alumina, and aluminum sol typically used in cracking catalysts. For example, it can be one or more selected from the group consisting of γ-alumina, η-alumina, θ-alumina, χ-alumina, pseudo-boehmite, boehmite, gibbsite, Bayerite or aluminum sol, and is preferably pseudo-boehmite and/or aluminum sol. For example, the catalytic cracking catalyst may comprise from about 2% to about 15% by weight, preferably from about 3% to about 10% by weight, on a dry basis, of an aluminum sol binder and/or from about 10% to about 30% by weight, preferably about 15% to about 25% by weight on a dry basis of pseudo-boehmite binder.

In certain preferred embodiments, the catalyst according to the present application comprises, based on the weight of the catalyst, from about 10% to about 50% by weight, for example from about 15% to about 45% or from about 25% to about 40% by weight on a dry basis of the Y-type molecular sieve, and about 50% to about 90% by weight, for example 55-85% by weight or 60-75% by weight on a dry basis of a matrix, wherein the matrix comprises an additive-containing alumina, clay, and optionally a binder, and the binder is preferably an alumina binder.

In a further preferred embodiment, the catalytic cracking catalyst provided in the present application comprises, based on the weight of the catalyst, from about 10% to about 50% by weight on a dry basis of the modified Y-type molecular sieve, about 2% to about 40% by weight on a dry basis of the additive-containing alumina, and about 10% to about 80% by weight, on a dry basis, of the clay; wherein the additive-containing alumina comprises, on a dry basis and based on the weight of the additive-containing alumina, about 60% to about 99.5% by weight of alumina and about 0.5% to about 40% by weight of an additive that is one or more selected from the group consisting of compounds containing alkaline earth metal, lanthanide metal, silicon, gallium, boron, and/or phosphorus.

In a preferred embodiment, in the catalytic cracking catalyst provided in the present application, the modified Y-type molecular sieve is present in an amount on a dry basis of about 10% to about 50% by weight, preferably about 15% to about 45% by weight, for example, about 20-40% by weight, 25-40% by weight or 25-35% by weight.

In certain preferred embodiments, in the catalytic cracking catalyst according to the present application, the clay is present in an amount of no more than about 70% by weight, preferably from about 10% to about 70% by weight, based on the weight of the catalyst. Preferably, the clay is one or more selected from the group consisting of the clays suitable for use as a component in cracking catalysts, such as one or more of kaolin, hydrated halloysite, montmorillonite, diatomaceous earth, halloysite, saponite, rector, sepiolite, attapulgite, hydrotalcite, and bentonite, which are well known to those skilled in the art. Particularly preferably, the clay is present in the catalytic cracking catalyst provided in the present application in an amount of from about 20% to about 55% by weight, more preferably from about 30% to about 50% by weight on a dry basis.

In certain preferred embodiments, in the catalytic cracking catalyst according to the present application, the additive-containing alumina is present in an amount on a dry basis of from about 2% to about 40% by weight, preferably from about 2% to about 20% by weight, based on the weight of the catalyst. Preferably, the additive-containing alumina can be prepared in accordance with the methods described in the patent application publication Nos. CN1915486A, CN1915485A, and CN1916116A, all of which are hereby incorporated by reference in their entireties. Preferably, the additive-containing alumina comprises, based on the dry weight of the additive-containing alumina, from about 70% to about 95% by weight of alumina, and from about 5% to about 30% by weight of an additive, which is preferably a compound containing phosphorus and/or magnesium.

In a preferred embodiment, the additive-containing alumina is prepared by a method comprising the following steps:

(1) mixing pseudo-boehmite with an amount of water sufficient to make a slurry and acid under stirring, wherein the acid is used in an amount such that the weight ratio of the acid to the alumina in the pseudo-boehmite is about 0.01-0.5;

(2) subjecting the mixed slurry obtained in the step (1) to aging at a temperature of from room temperature to about 90° C. for about 0-24 hours; and (3) mixing the product obtained in the step (2) with an additive, optionally drying and optionally calcining.

In a further preferred embodiment, in the step (1) of the method for preparing the additive-containing alumina, the acid is used in an amount such that the weight ratio of the acid to the alumina in the pseudo-boehmite is from about 0.05 to about 0.3. Preferably, the slurry formed by pseudo-boehmite and water in the step (1) has a solid content of from about 10% to about 50% by weight, preferably from about 15% to about 30% by weight. The acid is one or more selected from the group consisting of inorganic acids and organic acids. For example, the inorganic acid may be one or more of hydrochloric acid, nitric acid, sulfuric acid and phosphoric acid, and the organic acid may be one or more of formic acid, acetic acid, oxalic acid or citric acid, preferably hydrochloric acid or nitric acid.

In a further preferred embodiment, in the step (2) of the method for preparing the additive-containing alumina, the aging is carried out at a temperature of from room temperature to about 80° C., the room temperature being, for example, about 15-40° C., for an aging time of about 0.5-4 hours.

In a preferred embodiment, the mixture of the product of the step (2) and the additive obtained in the step (3) of the method for preparing the additive-containing alumina can be directly used for preparing a catalytic cracking catalyst, that is, the formed mixture can be mixed with other components for forming the catalytic cracking catalyst or can be used to prepare a catalyst after drying and calcination. The drying is, for example, oven drying or spray drying.

In a further preferred embodiment, in the step (3) of the method for preparing the additive-containing alumina, the calcination temperature is about 350-800° C., for example about 400-600° C., and the calcination time is, for example, about 0.5-8 hours.

In a preferred embodiment, the additive is one or more selected from the group consisting of compounds containing alkaline earth metal, lanthanide metal, silicon, gallium, boron and/or phosphorus. The compound containing alkaline earth metal, lanthanide metal, silicon, gallium, boron and/or phosphorus may be an oxide or a hydrous oxide of these elements, such as one or more of magnesium oxide and magnesium hydroxide as the alkaline earth metal, rare earth oxide as the lanthanide metal, silica, silica sol, and phosphorus oxide; or salts containing the above elements, such as one or more of nitrates of alkaline earth metals, rare earth chlorides as the lanthanide metal, silicates and phosphates. When the additive is an oxide and/or a hydrous oxide of the elements, the mixing is carried out by directly mixing the product obtained in the step (2) with the additive; when the additive is one or more of the salts containing the elements, the mixing is preferably carried out by first formulating the salt into an aqueous solution and then mixing the solution with the product obtained in the step (2). The mixing involved in each step can be carried out by various existing methods, and the preferred method is to mix under conditions sufficient to slurry the materials (such as pseudo-boehmite, the additive), and the slurrying method is well known to those skilled in the art, which comprises introducing a sufficient amount of water to slurry the material such that the solid content of the slurry is generally from about 10% to about 50% by weight, preferably from about 15% to about 30% by weight.

In a preferred embodiment, the catalytic cracking catalyst according to the present application comprises both an additive-containing alumina and an alumina binder, wherein the alumina binder is present in an amount on a dry basis of no more than about 32% by weight, preferably about 5% to about 32% by weight, based on the weight of the catalyst. In a further preferred embodiment, the catalytic cracking catalyst comprises from about 2% to about 15% by weight, preferably from 3% to 10% by weight, on a dry basis, of an aluminum sol binder and/or from about 10% to about 30% by weight, preferably from about 15% to about 25% by weight, on a dry basis, of pseudo-boehmite binder.

In a preferred embodiment, the total content of the alumina binder and the additive-containing alumina in the catalyst according to the present application is from about 10% to about 40% by weight, for example from about 20% to about 35% by weight, and the content of the additive-containing alumina is from about 2% to about 20% by weight, based on the weight of the catalyst.

In a preferred embodiment, the catalyst provided in the present application may further comprise an additional molecular sieve other than the modified Y-type molecular sieve. The additional molecule sieve can be selected from molecular sieves useful in catalytic cracking catalysts, such as one or more of zeolites having MFI structure, Beta zeolite, other Y zeolites, and non-zeolitic molecular sieves. The additional molecular sieve may be present in an amount, on a dry basis, of about 0% to about 40% by weight, for example from about 0% to about 30% by weight or from about 1% to about 20% by weight. Preferably, the additional Y-type molecular sieve is present in an amount, on a dry basis, of no more than about 40% by weight, for example from about 1% to about 40% by weight or from about 0% to about 20% by weight. The additional Y-type molecular sieve may be, for example, one or more of REY, REHY, DASY, SOY, and PSRY; the zeolite having MFI structure may be, for example, one or more of HZSM-5, ZRP, and ZSP; the beta zeolite may be, for example, HP; and the non-zeolitic molecular sieve may be, for example, one or more of aluminum phosphate molecular sieves (AlPO molecular sieves) and silicoaluminophosphate molecular sieves (SAPO molecular sieves). Preferably, the additional molecular sieve is present in an amount of no more than about 20% by weight, based on the weight of the catalyst.

In a preferred embodiment, the catalytic cracking catalyst provided in the present application comprises, on a dry basis and based on the weight of the catalyst, about 10% to about 50% by weight of the modified Y-type molecular sieve, about 2% to about 40% by weight of the additive-containing alumina, about 0% to about 40% by weight of the alumina binder, and about 10% to about 80% by weight of the clay. Preferably, the catalytic cracking catalyst comprises, on a dry basis, about 25-40% by weight of the modified Y-type molecular sieve, about 2-20% by weight of the additive-containing alumina, about 5-30% by weight of the alumina binder and about 30-50% by weight of the clay, and the total content of the alumina binder and the additive-containing alumina is about 20-35% by weight.

In certain embodiments, except for the modified Y-type molecular sieve, the catalyst according to the present application can be prepared using existing methods, which are described in detail in the patent application publication Nos. CN1916116A, CN1362472A, CN1727442A, CN1132898C, CN1727445A and CN1098130A, which are incorporated herein by reference. Further, said spray drying, washing, and drying are conventional technical means, and the present application has no special requirements. For example, in a preferred embodiment, the method for the preparation of the catalyst comprises the steps of mixing the modified Y-type molecular sieve, the additive-containing alumina, the clay, the optional alumina binder, and water to form a slurry, spray drying, washing, filtering, and drying.

Particularly preferably, the present application provides the following preferred embodiments:

Item 1. A magnesium modified Y-type molecular sieve, having a rare earth oxide content of about 4% to about 11% by weight, a magnesium oxide content of about 0.1% to about 4% by weight, a sodium oxide content of about 0.3% to about 0.8% by weight, a total pore volume of about 0.33 mL/g to about 0.39 mL/g, a percentage of the pore volume of secondary pores having a pore size of 2-100 nm to the total pore volume of the modified Y-type molecular sieve of about 10% to about 30%, a lattice constant of about 2.440 nm to about 2.455 nm, a percentage of non-framework aluminum content to the total aluminum content of the modified Y-type molecular sieve of no more than about 20%, and a lattice collapse temperature of not lower than about 1045° C.

Item 2. The modified Y-type molecular sieve according to Item 1, wherein the modified Y-type molecular sieve has a percentage of the pore volume of secondary pores having a pore size of 2-100 nm to the total pore volume of about 15-25%.

Item 3. The modified Y-type molecular sieve according to Item 1 or 2, wherein the modified Y-type molecular sieve has a percentage of non-framework aluminum content to the total aluminum content of about 13-19%, and a framework silica-alumina ratio of about 7 to about 14 calculated on the basis of $SiO_2/Al_2O_3$ molar ratio.

Item 4. The modified Y-type molecular sieve according to any one of Items 1 to 3, wherein the modified Y-type molecular sieve has a lattice collapse temperature of about 1045-1075° C.

Item 5. The modified Y-type molecular sieve according to any one of Items 1 to 4, wherein the magnesium oxide content is from about 0.5 to about 3% by weight.

Item 6. The modified Y-type molecular sieve according to any one of Items 1 to 5, characterized in that, after aging at 800° C. under atmospheric pressure in 100% steam atmosphere for 17 hours, the modified Y-type molecular sieve shows a relative crystallinity retention of about 30% or more, for example, about 30-45%.

Item 7. The modified Y-type molecular sieve according to any one of Items 1 to 6, wherein the modified Y-type molecular sieve has a relative crystallinity of about 55-68%.

Item 8. The modified Y-type molecular sieve according to any one of Items 1-7, wherein the modified Y-type molecular sieve has a rare earth oxide content of about 4.5% to about 10% by weight, a sodium oxide content of about 0.4-0.6% by weight, a lattice constant of 2.442-2.451 nm, and a framework silica-alumina ratio of about 8.5-12.6.

Item 9. A method for the preparation of a modified Y-type molecular sieve, comprising the steps of:

(1) contacting a NaY molecular sieve with a rare earth salt solution for ion-exchange reaction, filtering, washing, and optionally drying, to obtain a rare earth modified Y-type molecular sieve having a normal lattice constant and a reduced sodium oxide content;

(2) subjecting the above rare earth modified Y-type molecular sieve having a normal lattice constant and a reduced sodium oxide content to roasting at a temperature of about 350 to 480° C. in an atmosphere containing about 30 vol % to about 90 vol % of steam for about 4.5-7 hours, optionally drying, to obtain a Y-type molecular sieve having a reduced lattice constant;

(3) contacting and reacting the Y-type molecular sieve having a reduced lattice constant with gaseous silicon tetrachloride at a weight ration of $SiCl_4$:the Y-type molecular sieve having a reduced lattice constant on a dry basis of about 0.1:1 to about 0.7:1, and a reaction temperature of about 200° C. to about 650° C., for a reaction time of about 10 minutes to about 5 hours, optionally washing and filtering, optionally contacting with an acid solution for channel cleaning, to obtain a high-silica ultra-stable Y-type molecular sieve; and (4) subjecting the high-silica ultra-stable Y-type molecular sieve obtained in the step (3) to modification with a magnesium compound, to obtain the modified Y-type molecular sieve.

Item 10. The method according to Item 9, characterized in that the rare earth modified Y-type molecular sieve having a normal lattice constant and a reduced sodium oxide content obtained in the step (1) has a lattice constant of 2.465-2.472 nm, and a sodium oxide content of no more than about 9.5% by weight.

Item 11. The method according to Item 9, characterized in that the rare earth modified Y-type molecular sieve having a normal lattice constant and a reduced sodium oxide content obtained in the step (1) has a rare earth content of about 4.5-13% by weight on the basis of $RE_2O_3$, a sodium oxide content of about 5-9.5 wt %, for example about 5.5-9.0 wt %, and a lattice constant of about 2.465-2.472 nm.

Item 12. The method according to any one of Items 9-11, characterized in that, in the step (1), said contacting the NaY molecular sieve with the rare earth salt solution for ion-exchange reaction is carried out by forming a mixture of NaY molecular sieve, rare earth salt and water at a weight ratio of the NaY molecular sieve:rare earth salt:$H_2O$ of about 1:0.01-0.18:5-15, and stirring.

Item 13. The method according to any one of Items 9-12, wherein, in the step (1), said contacting the NaY molecular sieve with the rare earth solution for ion-exchange reaction comprises: mixing the NaY molecular sieve with decationized water, adding a rare earth salt and/or a rare earth salt solution with stirring for ion-exchange reaction, filtering, and washing; wherein the conditions for the ion-exchange reaction include: an ion-exchange temperature of about 15-95° C., an ion-exchange time of about 30-120 minutes, and an aqueous rare earth salt solution used as the rare earth salt solution.

Item 14. The method of any one of Items 9-13, wherein, in the step (2), the roasting temperature is about 380-460° C., the roasting atmosphere is an atmosphere containing about 40-80 vol % steam, and the roasting time is about 5-6 hours.

Item 15. The method according to any one of Items 9-14, wherein the Y-type molecular sieve having a reduced lattice constant obtained in the step (2) has a lattice constant of 2.450-2.462 nm and a water content of no more than about 1% by weight.

Item 16. The method according to any one of Items 9-15, wherein the washing in the step (3) is carried out using water under the following conditions: a ratio of molecular sieve:$H_2O$ of about 1:6-15, a pH value of about 2.5-5.0 and a washing temperature of about 30-60° C.

Item 17. The method according to any one of Items 9-16, wherein the rare earth salt is rare earth chloride and/or rare earth nitrate; and the magnesium compound is magnesium chloride and/or magnesium nitrate.

Item 18. The method according to any one of Items 9-17, wherein, in the step (3), the acid solution comprises an organic acid and an inorganic acid having a medium or higher strength, wherein the weight ratio of the inorganic acid having a medium or higher strength to the molecular sieve is about 0.01-0.05:1, the weight ratio of the organic acid to the molecular sieve is about 0.02-0.10:1, the weight ratio of water to the molecular sieve is about 5-20:1, the contact temperature is about 80-99° C., and the contact time is about 1-4 hours.

Item 19. The method according to any one of Items 9 to 18, wherein, in the step (3), the contacting with the acid solution is carried out by first contacting with the inorganic acid having a medium or higher strength, and then contacting with the organic acid, wherein the contacting with the inorganic acid having a medium or higher strength is carried out under the following conditions: a weight ratio of the inorganic acid to the molecular sieve of about 0.01-0.05:1, a weight ratio of water to the molecular sieve of about 5-20:1, a contact time of about 60-120 minutes, and a contact temperature of about 90-98° C.; and the contacting with the organic acid is carried out under the following conditions: a weight ratio of the organic acid to the molecular sieve of about 0.02-0.10:1, a weight ratio of water to the molecular sieve of about 5-20:1, a contact time of about 60-120 minutes, and a contact temperature of about 90-98° C.

Item 20. The method according to Item 18 or 19, wherein the organic acid is one or more selected from the group consisting of oxalic acid, malonic acid, succinic acid, methyl succinic acid, malic acid, tartaric acid, citric acid and salicylic acid; the inorganic acid having a medium or higher strength is one or more selected from the group consisting of phosphoric acid, hydrochloric acid, nitric acid and sulfuric acid.

Item 21. The method according to any one of Items 9 to 20, wherein, in the step (4), the modification with a magnesium compound comprises: adding the molecular sieve to a solution containing a magnesium salt, stirring at about 5-50° C. for about 10-120 minutes, then adding ammonia water to adjust the pH of the solution to about 7.5-10, stirring evenly, filtered, and rinsed with water; subjecting the filter cake to drying, and then to calcining at 500-650° C. for at least 1 hour, to obtain a high-silica ultra-stable magnesium-modified Y-type molecular sieve; wherein in the mixture of the magnesium salt solution and the molecular sieve, the weight ratio of water to the molecular sieve is about 1-6, preferably about 1.5-3.5, and the weight ratio of the magnesium salt, calculated on the basis of magnesium oxide, to the molecular sieve is from about 0.001 to about 0.04, preferably from about 0.005 to about 0.035.

Item 22. A catalytic cracking catalyst, comprising, on a dry basis, about 10% to about 50% by weight of modified Y-type molecular sieve, about 2% to about 40% by weight of an additive-containing alumina, and about 10% to about 80% by weight of clay; wherein the additive-containing alumina comprises, on a dry basis, about 60% to about 99.5% by weight of alumina and 0.5% to 40% by weight of an additive that is one or more selected from the group consisting of compounds containing alkaline earth metal, lanthanide metal, silicon, gallium, boron or phosphorus, the magnesium modified Y-type molecular sieve is a modified Y-type molecular sieve according to any one of Items 1-8 or a modified Y-type molecular sieve obtained by the method according to any one of Items 9-21.

Item 23. The catalytic cracking catalyst according to Item 22, wherein the catalyst comprises about 25-40% by weight, on a dry basis, of the modified Y-type molecular sieve, about 2-20% by weight on a dry basis of the additive-containing alumina, about 5-30% by weight on a dry basis of an alumina binder, and about 30-50% by weight, on a dry basis, of clay.

Item 24. The catalytic cracking catalyst according to Item 22 or 23, wherein the clay is one or more selected from the group consisting of kaolin, hydrated halloysite, montmorillonite, diatomaceous earth, halloysite, saponite, rector, sepiolite, attapulgite, hydrotalcite, and bentonite.

Item 25. The catalytic cracking catalyst according to any one of Items 22-24, wherein the additive-containing alumina is prepared by a method comprising the steps of:

(1) mixing pseudo-boehmite with an amount of water sufficient to make a slurry and acid under stirring, wherein the acid is used in an amount such that the weight ratio of the acid to the alumina in the pseudo-boehmite is about 0.01-0.5;

(2) subjecting the mixed slurry obtained in the step (1) to aging at a temperature of from room temperature to about 90° C. for about 0 to 24 hours; and (3) mixing the product obtained in the step (2) with an additive, optionally drying and optionally calcining.

Item 26. A catalytic cracking catalyst, comprising about 10% to about 50% by weight on a dry basis of a magnesium modified Y-type molecular sieve, about 10% to about 40% by weight of an alumina binder calculated on the basis of alumina, and about 10% to about 80% by weight on a dry basis of clay; wherein the magnesium modified Y-type molecular sieve has a rare earth oxide content of about 4% to about 11% by weight, a magnesium oxide content of about 0.1% to about 4% by weight, a sodium oxide content of about 0.3-0.8% by weight, a total pore volume of about 0.33 mL/g to about 0.39 mL/g, a percentage of the pore volume of secondary pores having a pore size of 2-100 nm to the total pore volume of the modified Y-type molecular sieve of about 10% to about 30%, a lattice constant of about 2.440 nm to about 2.455 nm, a percentage of non-framework aluminum content to the total aluminum content of the modified Y-type molecular sieve of no more than about 20%, and a lattice collapse temperature of not lower than about 1045° C.

Item 27. A catalytic cracking catalyst, comprising about 10% to about 50% by weight on a dry basis of a magnesium modified Y-type molecular sieve, about 2% to about 40% by weight on a dry basis of an additive-containing alumina, and about 10% to about 80% by weight on a dry basis of clay; wherein the additive-containing alumina comprises, on a dry basis, from about 60% to about 99.5% by weight of alumina and from about 0.5% to about 40% by weight of an additive that is one or more selected from the group consisting of compounds containing alkaline earth metal, lanthanide metal, silicon, gallium, boron or phosphorus, the magnesium modified Y-type molecular sieve has a rare earth oxide content of about 4% to about 11% by weight, a magnesium oxide content of about 0.1% to about 4% by weight, a sodium oxide content of about 0.3% to about 0.8% by weight, a total pore volume of about 0.33 mL/g to about 0.39 mL/g, a percentage of the pore volume of secondary pores having a pore size of 2-100 nm to the total pore volume of the modified Y-type molecular sieve of about 10% to about 30%, a lattice constant of about 2.440 nm to about 2.455 nm, a percentage of non-framework aluminum content to the total aluminum content of the modified Y-type molecular sieve of no more than about 20%, and a lattice collapse temperature of not lower than about 1045° C.

EXAMPLES

The present application will be further illustrated by the following examples, without however limiting the present invention.

Feedstocks: In the following examples and comparative examples, NaY molecular sieves are supplied by Qilu Branch of Sinopec Catalyst Co., Ltd., of which the sodium oxide content is 13.5% by weight, the framework silica-alumina ratio ($SiO_2/Al_2O_3$ molar ratio) is 4.6, the lattice constant is 2.470 nm, and the relative crystallinity is 90%; rare earth chloride and rare earth nitrate are chemically pure reagents Beijing Chemical Plant; pseudo-boehmite is an industrial product Shandong Aluminum Plant with a solid content of 61% by weight; kaolin is China Kaolin Clay Co., Ltd. of Suzhou with a solid content of 76% by weight; aluminum sol is supplied by Qilu Branch of Sinopec Catalyst Co., Ltd. having an alumina content of 21% by weight.

Analytical method: In each of the comparative examples and examples, the element content of the molecular sieve was determined by X-ray fluorescence spectrometry; the lattice constant and relative crystallinity of the molecular sieve were determined by X-ray powder diffraction (XRD) according to the RIPP 145-90, RIPP 146-90 standard method (see "Petrochemical Analysis Methods (RIPP Test Methods)", edited by Cuiding YANG et al., Science Press, September 1990, First Edition, pp. 412-415), the framework silica-alumina ratio of the molecular sieve was calculated according to the following equation:

$$SiO_2/Al_2O_3 = (2.5858 - a_0) \times 2/(a_0 - 2.4191)$$

wherein $a_0$ refers to the lattice constant of which the unit is nm.

The total silica-alumina ratio of the molecular sieve was calculated based on the content of Si and Al elements determined by X-ray fluorescence spectrometry. The percentage of the framework Al content to the total Al content was calculated based on the framework silica-alumina ratio determined by XRD and the total silica-alumina ratio determined by XRF, and then the percentage of non-framework Al content to the total Al content was calculated. The lattice collapse temperature was determined by differential thermal analysis (DTA).

In each of the comparative examples and examples, the method for determining the pore volume of secondary pores was as follows: according to the RIPP 151-90 standard method (see "Petrochemical Analysis Methods (RIPP Test Methods)", Cuiding YANG et al., Science Press, September 1990, First Edition, pp. 424-426), the total pore volume of the molecular sieve was determined based on the adsorption isotherm, and then the micropore volume of the molecular sieve was determined based on the adsorption isotherm according to the T-plot method, and the pore volume of secondary pores was obtained by subtracting the micropore volume from the total pore volume.

In each of the comparative examples and examples, the surface $SiO_2/Al_2O_3$ molar ratio of the molecular sieve was determined as follows: the percentage by mass of Si and Al atoms on the surface of the molecular sieve was determined by XPS photoelectron spectroscopy, and then the surface SiO$_2$/Al$_2$O$_3$ molar ratio of the molecular sieve was calculated. XPS photoelectron spectroscopy was performed on the ESCALab 250 X-ray photoelectron spectrometer of Thermo Scientific Company. The excitation source was monochromated Al Kα X-ray with an energy of 1486.6 eV and a power of 150 W. The penetration energy for narrow scans was 30 eV. The base vacuum at the time of analysis was about 6.5×10$^{-10}$ mbar. The binding energy was calibrated in accordance with the C1s peak (284.8 eV) of alkyl carbon or contaminated carbon.

Unless otherwise stated, the reagents used in each of the comparative examples and examples were chemically pure reagents.

Example 1

2000 g of NaY molecular sieve (on a dry basis) was added to 20 liters of decationized aqueous solution, stirred evenly, 600 ml of RE(NO$_3$)$_3$ solution (solution concentration of 319 g/L on the basis of RE$_2$O$_3$) was added thereto, stirred, and heated to 90-95° C. for 1 hour. Then, the mixture was filtered and washed, and the filter cake was dried at 120° C. to obtain a Y-type molecular sieve having a lattice constant of 2.471 nm, a sodium oxide content of 7.0% by weight, and a rare earth content of 8.8% by weight on the basis of RE$_2$O$_3$. After that, it was roasted at a temperature of 390° C. for 6 hours in an atmosphere containing 50% by volume of steam and 50% by volume of air to obtain a Y-type molecular sieve having a lattice constant of 2.455 nm, followed by drying, to obtain a water content of less than 1% by weight. Then, gaseous SiCl$_4$ vaporized by heat was introduced at a weight ratio of SiCl$_4$:the Y-type molecular sieve (dry basis) of 0.5:1, and reacted for 2 hours at a temperature of 400° C. After that, the resultant was washed with 20 liters of decationized water, and then filtered, and the molecular sieve cake was added to a solution containing magnesium chloride, in which the weight ratio of water to the molecular sieve was 2.5, and the weight ratio of magnesium (on the basis magnesium oxide) to the molecular sieve was 0.01. After stirring at 25° C. for 40 minutes, ammonia water was added to adjust the pH of the solution to 8.5, stirred evenly, filtered, and rinsed with deionized water. The filter cake was dried, then placed in a muffle furnace and roasted at 550° C. for 2 hours, to obtain a Y-type molecular sieve modified by magnesium, designated as SZ1, of which the physicochemical properties are listed in Table 1.

After SZ1 was aged in a bare state at 800° C. under atmospheric pressure in an atmosphere of 100 vol % steam for 17 hours, the relative crystallinity of the molecular sieve SZ1 before and after aging was analyzed by XRD, and the relative crystallinity retention after aging was calculated. The results are shown in Table 2, in which:

Relative crystallinity retention =
$$\frac{\text{Relative crystallinity of aged sample}}{\text{Relative crystallinity of fresh sample}} \times 100\%$$

Example 2

2000 g of NaY molecular sieve (on a dry basis) was added to 25 liters of decationized aqueous solution, stirred evenly, 800 ml of RECl$_3$ solution (solution concentration of 319 g/L on the basis of RE$_2$O$_3$) was added, stirred, and heated to 90-95° C. for 1 hour. Then, the mixture was filtered and washed, and the filter cake was dried at 120° C., to obtain a Y-type molecular sieve having a lattice constant of 2.471 nm, a sodium oxide content of 5.5% by weight, and a rare earth content of 11.3% by weight on the basis of RE$_2$O$_3$. After that, it was roasted at a temperature of 450° C. in 80% steam atmosphere for 5.5 hours, to obtain a Y-type molecular sieve having a lattice constant of 2.461 nm, followed by drying, to obtain a water content of less than 1% by weight. Then, gaseous SiCl$_4$ vaporized by heat was introduced at a weight ratio of SiCl$_4$:the Y-type molecular sieve of 0.6:1, and reacted for 1.5 hours at a temperature of 480° C. After that, the resultant was washed with 20 liters of decationized water, and then filtered, and the molecular sieve cake was added to a solution containing magnesium nitrate, in which the weight ratio of water to the molecular sieve was 2.3, and the weight ratio of magnesium (on the basis magnesium oxide) to the molecular sieve was 0.02. After stirring at 30° C. for 35 minutes, ammonia water was added to adjust the pH of the solution to 9, stirring evenly, filtered, and rinsed with deionized water. The filter cake was dried, then placed in a muffle furnace and roasted at 590° C. for 2 hours, to obtain a Y-type molecular sieve modified by magnesium, designated as SZ2, of which the physicochemical properties are shown in Table 1.

After SZ2 was aged in a bare state at 800° C. under atmospheric pressure in 100% steam for 17 hours, the relative crystallinity of the molecular sieve SZ2 before and after aging was analyzed by XRD, and the relative crystallinity retention after aging was calculated. The results are shown in Table 2.

Example 3

2000 g of NaY molecular sieve (dry basis) was added to 22 liters of decationized aqueous solution, stirred evenly, 570 ml of RECl$_{13}$ solution (concentration of 319 g/L on the basis of RE$_2$O$_3$) was added thereto, stirred, heated to 90-95° C., and stirred for 1 hour, Then, the mixture was filtered and washed, and the filter cake was dried at 120° C. to obtain a Y-type molecular sieve having a lattice constant of 2.471 nm, a sodium oxide content of 7.5% by weight, and a rare earth content of 8.5% by weight on the basis of RE$_2$O$_3$. Then, it was roasted at a temperature of 470° C. in 70 vol % steam atmosphere for 5 hours, to obtain a Y-type molecular sieve having a lattice constant of 2.458 nm, followed by drying, to obtain a water content of less than 1% by weight. Then, gaseous SiCl$_4$ vaporized by heat was introduced at a weight ratio of SiCl$_4$:the Y-type molecular sieve of 0.4:1, and reacted for 1 hour at a temperature of 500° C. After that, the resultant was washed with 20 liters of decationized water, and then filtered, and the molecular sieve cake was added to a solution containing magnesium chloride, in which the weight ratio of water to the molecular sieve was 3.2, and the weight ratio of magnesium (on the basis of magnesium oxide) to the molecular sieve was 0.025. After stirring at 20° C. for 45 minutes, aqueous ammonia was added to adjust the pH of the solution to 9.2, stirred evenly, filtered, and rinsed with deionized water. The filter cake was dried, then placed in a muffle furnace and roasted at 580° C. for 2 hours, to obtain a Y-type molecular sieve modified by magnesium, designated as SZ3, of which the physicochemical properties are listed in Table 1.

After SZ3 was aged in a bare state at 800° C. under atmospheric pressure in 100% steam for 17 hours, the relative crystallinity of the molecular sieve SZ3 before and after aging was analyzed by XRD, and the relative crystallinity retention after aging was calculated. The results are shown in Table 2.

Comparative Example 1

2000 g of NaY molecular sieve (dry basis) was added to 20 liters of decationized aqueous solution, stirred evenly, and 1000 g of $(NH_4)_2SO_4$ was added thereto, stirred, and heated to 90-95° C. for 1 hour. Then, the mixture was filtered and washed, and the filter cake was dried at 120° C., and then subjected to hydrothermal modification treatment by roasting at a temperature of 650° C. in a 100% steam atmosphere for 5 hours. Then, the resultant was added to 20 liters of decationized aqueous solution, stirred evenly, and 1000 g of $(NH_4)_2SO_4$ was added thereto, stirred, and heated to 90-95° C. for 1 hour. Then, the mixture was filtered and washed, the filter cake was dried at 120° C. and then subjected to a second hydrothermal modification treatment by roasting at a temperature of 650° C. in a 100% steam atmosphere for 5 hours, to obtain a hydrothermally ultra-stabilized Y-type molecular sieve free of rare earth that have undergone two stages of ion-exchange and two stages of hydrothermal modification, designated as DZ1, of which the physicochemical properties are shown in Table 1.

After DZ1 was aged in a bare state at 800° C. under atmospheric pressure in an atmosphere of 100 vol % steam for 17 hours, the relative crystallinity of the molecular sieve DZ1 before and after aging was analyzed by XRD, and the relative crystallinity retention after aging was calculated. The results are shown in Table 2.

Comparative Example 2

2000 g of NaY molecular sieve (dry basis) was added to 20 liters of decationized aqueous solution, stirred evenly, and 1000 g of $(NH_4)_2SO_4$ was added thereto, stirred, and heated to 90-95° C. for 1 hour. Then, the mixture was filtered and washed, and the filter cake was dried at 120° C., and then subjected to hydrothermal modification treatment by roasting at a temperature of 650° C. in 100% steam atmosphere for 5 hours. Then, the resultant was added to 20 liters of decationized aqueous solution, stirred evenly, 200 ml of $RE(NO_3)_3$ solution (concentration of 319 g/L on the basis of $RE_2O_3$) and 900 g $(NH_4)_2SO_4$ were added thereto, stirred and heated to 90-95° C. for 1 hour. Then, the mixture was filtered and washed, the filter cake was dried at 120° C. and then subjected to a second hydrothermal modification treatment by roasting at a temperature of 650° C. in a 100% steam atmosphere for 5 hours, to obtain a hydrothermally ultra-stabilized Y-type molecular sieve containing rare earth that have undergone two stages of ion-exchange and two stages of hydrothermal modification, designated as DZ2, of which the physicochemical properties are shown in Table 1.

After DZ2 was aged in a bare state at 800° C. under atmospheric pressure in an atmosphere of 100 vol % steam for 17 hours, the relative crystallinity of the molecular sieve DZ2 before and after aging was analyzed by XRD, and the relative crystallinity retention after aging was calculated. The results are shown in Table 2.

Comparative Example 3

2000 g of NaY molecular sieve (dry basis) was added to 20 liters of decationized aqueous solution, stirred evenly, 650 ml of $RE(NO_3)_3$ solution (solution concentration of 319 g/L on the basis of $RE_2O_3$) was added, stirred, and heated to 90-95° C. for 1 hour. Then the mixture was filtered and washed, and then the molecular sieve was dried to obtain a water content of less than 1% by weight. Then, gaseous $SiCl_4$ vaporized by heat was introduced at a weight ratio of $SiCl_4$:the Y-type molecular sieve of 0.4:1, and reacted for 1.5 hours at a temperature of 580° C. After that, the resultant was washed with 20 liters of decationized water, and then filtered, and the molecular sieve cake was added to a solution containing magnesium chloride, in which the weight ratio of water to the molecular sieve was 3.2, and the weight ratio of magnesium (on the basis of magnesium oxide) to the molecular sieve was 0.025. After stirring at 20° C. for 45 minutes, aqueous ammonia was added to adjust the pH of the solution to 9.2, stirred evenly, filtered, and rinsed with deionized water. The filter cake was dried, then placed in a muffle furnace and roasted at 580° C. for 2 hours, to obtain an ultra-stable magnesium modified Y-type molecular sieve, designated as DZ3, of which the physicochemical properties are listed in Table 1.

After DZ3 was aged in a bare state at 800° C. under atmospheric pressure in an atmosphere of 100 vol % steam for 17 hours, the relative crystallinity of the molecular sieve DZ3 before and after aging was analyzed by XRD, and the relative crystallinity retention after aging was calculated. The results are shown in Table 2.

Comparative Example 4

2000 g of NaY molecular sieve (dry basis) was added to 22 liters of decationized aqueous solution, stirred evenly, 570 ml of $RECl_{13}$ solution (concentration of 319 g/L on the basis of $RE_2O_3$) was added, stirred, heated to 90-95° C., and stirred for 1 hour, Then, the mixture was filtered and washed, and the filter cake was dried at 120° C. to obtain a Y-type molecular sieve having a lattice constant of 2.471 nm, a sodium oxide content of 7.5% by weight, and a rare earth content of 8.5% by weight on the basis of $RE_2O_3$. Then, it was roasted at a temperature of 650° C. in a 100 vol % steam atmosphere for 5 hours, and then dried, to obtain a water content of less than 1% by weight. Then, gaseous $SiCl_4$ vaporized by heat was introduced at a weight ratio of $SiCl_4$:the Y-type molecular sieve of 0.4:1, and reacted for 1 hour at a temperature of 500° C. After that, the resultant was washed with 20 liters of decationized water, and then filtered, and the molecular sieve cake was added to a solution containing magnesium chloride, in which the weight ratio of water to the molecular sieve was 3.2, and the weight ratio of magnesium (on the basis of magnesium oxide) to the molecular sieve was 0.025. After stirring at 20° C. for 45 minutes, aqueous ammonia was added to adjust the pH of the solution to 9.2, stirred evenly, filtered, and rinsed with deionized water. The filter cake was dried, then placed in a muffle furnace and roasted at 580° C. for 2 hours, to obtain an ultra-stable magnesium modified Y-type molecular sieve, designated as DZ4, of which the physicochemical properties are shown in Table 1.

After DZ4 was aged in a bare state at 800° C. under atmospheric pressure in an atmosphere of 100 vol % steam for 17 hours, the relative crystallinity of the molecular sieve DZ4 before and after aging was analyzed by XRD, and the relative crystallinity retention after aging was calculated. The results are shown in Table 2.

Examples 4-6

Examples 4-6 illustrate the catalytic cracking activity and stability of the modified Y-type molecular sieve according to the present application obtained in Examples 1-3.

Catalysts designated as SC1, SC2 and SC3 were prepared using the modified Y-type molecular sieves SZ1, SZ2 and SZ3 obtained in Examples 1-3, respectively. After the catalysts were aged at 800° C. in 100% steam atmosphere for 4 hours or 17 hours, the micro-activity for light oils of the catalysts was evaluated, and the results are shown in Table 3.

Preparation of the Catalysts:

714.5 g of an aluminum sol having an alumina content of 21% by weight was added to 1565.5 g of decationized water, started stirring, 2763 g of kaolin having a solid content of 76% by weight was added, and dispersed for 60 minutes to obtain a dispersed kaolin slurry. 2049 g of pseudo-boehmite having an alumina content of 61% by weight was added to 8146 g of decationized water, 210 ml of hydrochloric acid having a concentration of 36% by weight was added under stirring, and acidified for 60 minutes, and then the dispersed kaolin slurry was added. Then, 1500 g (dry basis) of finely ground modified Y-type molecular sieve was added, and stirred evenly, followed by spray drying, washing, and drying, to obtain a catalyst. The catalyst obtained comprised 30% by weight of the modified Y-type molecular sieve, 42% by weight of kaolin, 25% by weight of pseudo-boehmite, and 3% by weight of aluminum sol.

Evaluation of Micro-Activity for Light Oils:

The micro-activity for light oils of each catalyst was evaluated according to the standard method of RIPP 92-90 (see "Petrochemical Analysis Methods (RIPP Test Methods)", edited by Cuiding YANG et al., Science Press, September 1990, First Edition, pp. 263-268), in which the catalyst loading was 5.0 g, the reaction temperature was 460° C., and the feedstock oil was Dagang light diesel oil having a distillation range of 235-337° C. The composition of the product was analyzed by gas chromatography, and the micro-activity for light oils was calculated based on the composition of the product.

Micro-activity for light oils (MA)=(production of gasoline below 216° C.+gas production+coke production)/total amount of feed×100%.

Comparative Examples 5-8

Comparative Examples 5-8 illustrate the catalytic cracking activity and stability of the ultra-stable Y-type molecular sieve obtained in Comparative Examples 1-4.

Ultra-stable Y-type molecular sieves DZ1, DZ2, DZ3 and DZ4 obtained in Comparative Examples 1-4 were each mixed with pseudo-boehmite, kaolin, water and aluminum sol, and spray dried to obtain a microsphere catalyst in accordance with the method for the preparation of the catalyst as described in Examples 4-6, the material ratio of each catalyst was the same as that of Example 4-6, and the content of the ultra-stable Y-type molecular sieve in the catalyst was 30% by weight. The catalysts are designated as DC1, DC2, DC3 and DC4, respectively. After the catalysts were aged at 800° C. in 100% steam atmosphere for 4 hours or 17 hours, their micro-activities for light oils were evaluated. The evaluation method is the same as that described in Examples 4-6, and the results are shown in Table 3.

Examples 7-9

Examples 7-9 illustrate the catalytic cracking performances of the modified Y-type molecular sieves according to the present application obtained in Examples 1-3.

The SC1, SC2 and SC3 catalysts were aged at 800° C. in 100% steam atmosphere for 17 hours, and their catalytic cracking performances were evaluated on a small fixed fluidized bed reactor (ACE). Cracked gas and product oils were collected separately and analyzed by gas chromatography. The catalyst loading was 9 g, the reaction temperature was 500° C., the weight hourly space velocity was 16 h$^{-1}$, and the catalyst-to-oil weight ratio is shown in Table 5. The properties of the feedstock used in the ACE test are shown in Table 4, and the results are shown in Table 5.

Comparative Examples 9-12

Comparative Examples 9-12 illustrate the catalytic cracking performances of the ultra-stable Y-type molecular sieves obtained in Comparative Examples 1-4.

The DC1, DC2, DC3 and DC4 catalysts were aged at 800° C. in 100% steam atmosphere for 17 hours, and their catalytic cracking performances were evaluated on a small fixed fluidized bed reactor (ACE). The evaluation method is the same as that described in Examples 7-9. The properties of the feedstock used in the ACE test are shown in Table 4, and the results are shown in Table 5.

TABLE 1

Properties of the modified Y-type molecular sieves

| | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|
| Name of molecular sieve | SZ1 | SZ2 | SZ3 | DZ1 | DZ2 | DZ3 | DZ4 |
| $RE_2O_3$ content/wt % | 5.6 | 8.5 | 6.3 | 0 | 2.7 | 6.1 | 6.2 |
| $Na_2O$ content/wt % | 0.50 | 0.57 | 0.44 | 1.3 | 1.5 | 0.79 | 0.48 |
| MgO content/wt % | 0.91 | 1.95 | 2.21 | 0 | 0 | 2.21 | 2.21 |
| Total $SiO_2/Al_2O_3$ molar ratio | 9.74 | 7.63 | 9.08 | 4.94 | 4.85 | 10.64 | 8.83 |
| Framework $SiO_2/Al_2O_3$ molar ratio | 11.95 | 8.79 | 10.87 | 10.39 | 7.83 | 11.39 | 11.95 |
| Surface $SiO_2/Al_2O_3$ molar ratio/Framework $SiO_2/Al_2O_3$ molar ratio | <1 | <1 | <1 | <1 | <1 | <1 | <1 |
| Framework aluminum/Total aluminum × 100 | 81.5 | 86.8 | 83.5 | 47.59 | 61.99 | 93.43 | 80.3 |

TABLE 1-continued

Properties of the modified Y-type molecular sieves

| | Example No. | | | | | | |
|---|---|---|---|---|---|---|---|
| | Ex. 1 | Ex. 2 | Ex. 3 | Comp. Ex. 1 | Comp. Ex. 2 | Comp. Ex. 3 | Comp. Ex. 4 |
| Non-framework aluminum/Total aluminum × 100 | 18.5 | 13.2 | 16.5 | 52.41 | 38.01 | 6.57 | 19.7 |
| Lattice constant/nm | 2.443 | 2.45 | 2.445 | 2.446 | 2.453 | 2.444 | 2.443 |
| crystallinity/% | 62.9 | 58.7 | 63.4 | 60.1 | 59.5 | 55.9 | 60.3 |
| Lattice collapse temperature/° C. | 1068 | 1055 | 1062 | 1038 | 1020 | 1043 | 1051 |
| Specific surface area/($m^2$/g) | 632 | 649 | 638 | 615 | 598 | 640 | 620 |
| Total pore volume/(mL/g) | 0.351 | 0.368 | 0.361 | 0.349 | 0.322 | 0.324 | 0.343 |
| Micropore volume/(mL/g) | 0.277 | 0.302 | 0.289 | 0.255 | 0.249 | 0.308 | 0.268 |
| Pore volume of secondary pores/(mL/g) | 0.074 | 0.066 | 0.072 | 0.094 | 0.073 | 0.017 | 0.075 |
| Percentage of pore volume of secondary pores having a pore size of 2.0-100 nm to the total pore volume/% | 21.08 | 17.94 | 19.94 | 26.93 | 22.67 | 5.24 | 21.86 |

It can be seen from Table 1 that the modified Y-type molecular sieve provided in the present application has the following advantages: low sodium oxide content, relatively lower non-framework aluminum content at a relatively higher silica-alumina ratio, relatively higher percentage of the pore volume of secondary pores having a pore size of 2.0-100 nm to the total pore volume, relatively higher crystallinity when the molecular sieve has a relatively smaller lattice constant and a relatively higher rare earth content, and high thermal stability.

TABLE 2

Aging test of the modified Y-type molecular sieves

| Example No. | Name of molecular sieve | Relative crystallinity of fresh molecular sieve sample (%) | Relative crystallinity of aged molecular sieve sample (%) (800° C./aged for 17 hours) | Relative crystallinity retention/% |
|---|---|---|---|---|
| Ex. 1 | SZ1 | 62.9 | 26.76 | 42.54 |
| Ex. 2 | SZ2 | 58.7 | 23.67 | 40.32 |
| Ex. 3 | SZ3 | 63.4 | 24.40 | 38.49 |
| Comp. Ex. 1 | DZ1 | 60.1 | 4.30 | 7.15 |
| Comp. Ex. 2 | DZ2 | 59.5 | 5.90 | 9.92 |
| Comp. Ex. 3 | DZ3 | 55.9 | 19.32 | 34.57 |
| Comp. Ex. 4 | DZ4 | 60.5 | 20.52 | 33.92 |

It can be seen from Table 2 that the modified Y-type molecular sieve provided in the present application shows a relatively higher relative crystallinity retention after being aged in a bare state under severe conditions at 800° C. for 17 hours, indicating that the modified Y-type molecular sieve provided in the present application has a high hydrothermal stability.

TABLE 3

Micro-activity of the catalytic cracking catalysts

| Example No. | Name of catalyst | MA (initial) (800° C./4 h) | MA (equilibrium) (800° C./17 h) | MA (equilibrium)/ MA (initial) |
|---|---|---|---|---|
| Ex. 4 | SC1 | 81 | 67 | 82.72 |
| Ex. 5 | SC2 | 82 | 65 | 79.27 |
| Ex. 6 | SC3 | 79 | 65 | 82.28 |
| Comp. Ex. 5 | DC1 | 41 | 18 | 43.90 |
| Comp. Ex. 6 | DC2 | 52 | 29 | 55.77 |
| Comp. Ex. 7 | DC3 | 78 | 56 | 71.79 |
| Comp. Ex. 8 | DC4 | 77 | 58 | 75.32 |

TABLE 4

Properties of feedstock oil used in the ACE evaluation

| Name | WuHan-mixed-III-2007 |
|---|---|
| Density (20° C.)/(g · $cm^{-3}$) | 0.9104 |
| Viscosity (80° C.)/($mm^2$/s) | 19.24 |
| Viscosity (100° C.)/($mm^2$/s) | 11.23 |
| Condensation point/° C. | 40 |
| Carbon residue/wt % | 3.11 |
| Saturated hydrocarbons/wt % | 62.3 |
| Aromatics/wt % | 22.7 |
| Colloid/wt % | 14.4 |
| Asphalt/wt % | 0.6 |
| Element mass fraction/% | |
| C | 86.9 |
| H | 12.63 |
| S | 0.61 |
| N | 0.2 |
| Distillation range (D1160)/° C. | |
| Initial boiling point | 267 |
| 5% | 318 |
| 10% | 339 |
| 30% | 407 |
| 50% | 451 |
| 70% | 494 |
| 81.5% | 540 |

TABLE 5

Catalytic cracking performances of the catalytic cracking catalysts

| | Ex. 7 | Ex. 8 | Ex. 9 | Comp. Ex. 9 | Comp. Ex. 10 | Comp. Ex. 11 | Comp. Ex. 12 |
|---|---|---|---|---|---|---|---|
| Name of catalyst | SC1 | SC2 | SC3 | DC1 | DC2 | DC3 | DC4 |
| Name of molecular sieve | SZ1 | SZ2 | SZ3 | DZ1 | DZ2 | DZ3 | DZ4 |
| Catalyst-to-oil ratio | 5 | 5 | 5 | 9 | 8 | 5 | 5 |
| Product distribution/wt % | | | | | | | |
| Dry gas | 1.39 | 1.41 | 1.38 | 1.55 | 1.48 | 1.47 | 1.41 |
| Liquefied gas | 15.87 | 15.87 | 16.04 | 16.86 | 15.33 | 16.03 | 15.92 |
| Coke | 4.48 | 4.61 | 4.32 | 8.33 | 7.61 | 6.15 | 5.12 |
| Gasoline | 45.29 | 44.91 | 43.99 | 38.55 | 43.91 | 49.19 | 43.57 |
| Diesel oil | 25.35 | 26.69 | 26.46 | 20.17 | 19.25 | 18.88 | 25.83 |
| Heavy oils | 7.62 | 6.51 | 7.81 | 14.54 | 12.42 | 8.28 | 8.15 |
| Total | 100 | 100 | 100 | 100 | 100 | 100 | 100 |
| Conversion/wt % | 67.03 | 66.8 | 65.73 | 65.29 | 68.33 | 72.84 | 66.02 |
| Coke selectivity/wt % | 6.68 | 6.90 | 6.57 | 12.76 | 11.14 | 8.44 | 7.76 |
| Light oil yield/wt % | 70.64 | 71.6 | 70.45 | 58.72 | 63.16 | 68.07 | 69.4 |
| Total liquid yield/wt % | 86.51 | 87.47 | 86.49 | 75.58 | 78.49 | 84.1 | 85.32 |
| Diesel-to-gasoline ratio | 0.56 | 0.59 | 0.60 | 0.52 | 0.44 | 0.38 | 0.59 |

It can be seen from the results listed in Tables 3 and 5 that the catalytic cracking catalyst prepared by using the modified Y-type molecular sieve provided in the present application as an active component has a higher hydrothermal stability, significantly lower coke selectivity, significantly higher liquid yield, significantly higher light oil yield, higher diesel oil yield, higher diesel-to-gasoline ratio, and higher heavy oil conversion activity.

The following Examples 4A-9A are directed to catalytic cracking catalysts comprising modified Y-type molecular sieves provided in the present application and modified matrix.

Example 4A 786 g of pseudo-boehmite having an alumina content of 61% by weight was added to 3909 g of decationized water, and 97.5 ml of chemically pure hydrochloric acid (containing 36% by weight of HCl) was added under stirring, and aged at 70° C. for 1 hour. Then, 82.5 ml of phosphoric acid (Beijing Chemical Plant, concentration 85%, analytically pure) and 185 g of an aqueous solution of magnesium chloride hexahydrate (Beijing Shuanghuan Reagent Plant, analytically pure) comprising 102 g of magnesium chloride hexahydrate were added and slurried, to obtain a slurry of an additive-containing alumina.

2499 g of an aluminum sol having an alumina content of 21% by weight was added to 5475 g of decationized water, and 2926.5 g of kaolin having a solid content of 76% by weight was added under stirring, and slurried for 60 minutes to obtain a kaolin slurry. 1180.5 g of pseudo-boehmite having an alumina content of 61% by weight was added to 4690.5 g of decationized water and slurried; 115.5 ml of chemically pure hydrochloric acid (containing 36% by weight of HCl) was added thereto with stirring. After aging for 60 minutes, the kaolin slurry previously prepared was added, the slurry of the additive-containing alumina previously prepared was further added, and slurried; then, 1800 g (dry basis) of SZ1 molecular sieve obtained in Example 1 and 300 g (dry basis) of REY molecular sieve [Qilu Branch of Sinopec Catalyst Co., Ltd., rare earth content (on the basis of $RE_2O_3$) 18% by weight, silica-alumina ratio ($SiO_2/Al_2O_3$ molar ratio) 4.6] were added, and slurried. Then, the resultant was spray dried at an inlet temperature of 650° C. and an exhaust gas temperature of 180° C., washed with deionized water, and dried to obtain a catalyst, designated as SC1A.

Example 5A 394 g of pseudo-boehmite having an alumina content of 61% by weight was added to 1958 g of decationized water, 49 ml of chemically pure hydrochloric acid (containing 36% by weight of HCl) was added with stirring, and then aged at 70° C. for 1 hour. Then, 288 g of an aqueous solution of magnesium chloride hexahydrate (Beijing Shuanghuan Reagent Co., Ltd.) comprising 164 g of magnesium chloride hexahydrate was added and slurried, to obtain a slurry of an additive-containing alumina.

1142 g of an aluminum sol having an alumina content of 21% by weight was added to 1001 g of decationized water, and 2336 g of kaolin having a solid content of 76% by weight was added thereto with stirring, and slurried for 60 minutes to obtain a kaolin slurry. 1180 g of pseudo-boehmite having an alumina content of 61% by weight was added to 5876 g of decationized water, 128 ml of hydrochloric acid (chemically pure, concentration 36% by weight) was added under stirring. After aging for 60 minutes, the kaolin slurry previously prepared was added, and slurried; the slurry of the additive-containing alumina previously prepared was further added, and slurried; then, 1824 g (dry basis) of the SZ2 molecular sieve obtained in Example 2 was added and slurried. Then, the resultant was spray dried and washed in the same manner as in Example 4A, followed by drying, to obtain a catalyst, designated as SC2A.

Example 6A 650 g of pseudo-boehmite having an alumina content of 61% by weight was added to 3232 g of decationized water, and 81.5 ml of chemically pure hydrochloric acid (HCl content of 36% by weight) was added under stirring, and aged at 70° C. for 1 hour. After that, 194 ml of phosphoric acid (Beijing Chemical Plant, concentration: 85% by weight, analytically pure) was added, and slurried, to obtain a slurry of an additive-containing alumina.

1885 g of an aluminum sol having an alumina content of 21% by weight was added to 3014 g of decationized water, and 3855 g of kaolin having a solid content of 76% by weight was added thereto by stirring, and slurried for 60 minutes to obtain a kaolin slurry. 2596 g of pseudo-boehmite having an alumina content of 61% by weight was added to 8402 g of decationized water, and 281 ml of chemically pure hydrochloric acid (concentration: 36% by weight) was added under stirring. After aging for 60 minutes, the kaolin slurry previously prepared was added, and slurried; the slurry of the additive-containing alumina previously prepared was further added, and slurried; then 1980 g (dry basis) of the SZ3 molecular sieve obtained in Example 3, 634 g (dry basis) of REY molecular sieve (the same as the REY molecular sieve used in Example 1) and 396 g (dry basis) of ZRP-5 molecular sieve (Qilu Branch of Sinopec Catalyst Co., Ltd., rare earth content 0.5% by weight, silica-alumina ratio 45) were added, and slurried. Then, the resultant was spray dried and washed in the same manner as in Example 4A, followed by drying, to obtain a catalyst, designated as SC3A.

Comparative Example 5A 1429 g of an aluminum sol having an alumina content of 21% by weight was added to 3131 g of decationized water, started stirring, and 5526 g of kaolin having a solid content of 76% by weight was added and dispersed for 60 minutes. 4098 g of pseudo-boehmite having an alumina content of 61% by weight was added to 16292 g of decationized water, and 420 ml of chemically pure hydrochloric acid (concentration: 36% by weight) was added under stirring. After 60 minutes of acidification, the dispersed kaolin slurry was added, followed by the addition of 3000 g (dry basis) of finely ground DZ1 molecular sieve obtained in Comparative Example 1. After stirring evenly, the resultant was spray dried and washed, followed by drying, to obtain a catalyst, designated as DC1A. The DC1A catalyst obtained comprised 30% by weight of DZ1 molecular sieve, 42% by weight of kaolin, 25% by weight of pseudo-boehmite, and 3% by weight of aluminum sol.

Comparative Example 6A

A slurry of the DZ2 molecular sieve obtained in Comparative Example 2, kaolin, water, pseudo-boehmite binder and aluminum sol was formed in accordance with a conventional method for preparing catalytic cracking catalysts, and spray dried to obtain a microspheroidal catalytic cracking catalyst, designated as DC2A (in accordance with the method for the preparation of the catalyst as described in Comparative Example 5A). The DC2A catalyst obtained comprised 30% by weight of DZ2 molecular sieve, 42% by weight of kaolin, 25% by weight of pseudo-boehmite, and 3% by weight of aluminum sol.

Comparative Example 7A

A slutty of the DZ3 molecular sieve obtained in Comparative Example 3, kaolin, water, pseudo-boehmite binder and aluminum sol was formed in accordance with a conventional method for preparing catalytic cracking catalysts, and spray dried to obtain a microspheroidal catalytic cracking catalyst, designated as DC3A (in accordance with the method for the preparation of the catalyst as described in Comparative Example 5A). The DC3A catalyst obtained comprised 30% by weight of DZ3 molecular sieve, 42% by weight of kaolin, 25% by weight of pseudo-boehmite, and 3% by weight of aluminum sol.

Comparative Example 8A

A catalyst was prepared in accordance with the method as described in Example 5A, except that the molecular sieve DZ3 obtained in Comparative Example 3 was used instead of the molecular sieve SZ2, to obtain a catalyst DC4A.

Example 7A-9A

The SC1A, SC2A and SC3A catalysts were aged at 800° C. in 100% steam atmosphere for 17 hours, and their catalytic cracking performances were evaluated on a small fixed fluidized bed reactor (ACE). Cracked gas and product oils were collected separately and analyzed by gas chromatography. The catalyst loading was 9 g, the reaction temperature was 500° C., the weight hourly space velocity was 16 h$^{-1}$, the catalyst-to-oil weight ratio is shown in Table 5A. The properties of the feedstock used in the ACE test are shown in Table 4, and the results are shown in Table 5A.

Comparative Examples 9A-12A

The DC1A, DC2A, DC3A and DC4A catalysts were aged at 800° C. in 100% steam atmosphere for 17 hours, and their catalytic cracking performances were evaluated on a small fixed fluidized bed reactor (ACE). The evaluation method is the same as that described in Examples 7A-9A. The properties of the feedstock used in the ACE test are shown in Table 4, and the results are shown in Table 5A.

TABLE 5A

Catalytic cracking performances of the catalytic cracking catalysts

| | Ex. 7A | Ex. 8A | Ex. 9A | Comp. Ex. 9A | Comp. Ex. 10A | Comp. Ex. 11A | Comp. Ex. 12A |
|---|---|---|---|---|---|---|---|
| Name of catalyst | SC1A | SC2A | SC3A | DC1A | DC2A | DC3A | DC4A |
| Name of molecular sieve | SZ1 | SZ2 | SZ3 | DZ1 | DZ2 | DZ3 | DZ3 |
| Catalyst-to-oil ratio | 4 | 4 | 4 | 9 | 8 | 5 | 5 |
| Product distribution/wt % | | | | | | | |
| Dry gas | 1.36 | 1.39 | 1.38 | 1.55 | 1.48 | 1.47 | 1.44 |
| Liquefied gas | 15.87 | 15.65 | 15.74 | 16.86 | 15.33 | 16.03 | 16.54 |
| Coke | 4.37 | 4.59 | 4.28 | 8.33 | 7.61 | 6.15 | 6.02 |
| Gasoline | 45.23 | 45.12 | 44.25 | 38.55 | 43.91 | 49.19 | 49.01 |
| Diesel oil | 25.64 | 26.87 | 26.62 | 20.17 | 19.25 | 18.88 | 18.95 |
| Heavy oils | 7.53 | 6.38 | 7.73 | 14.54 | 12.42 | 8.28 | 8.04 |
| Total | 100 | 100 | 100 | 100 | 100 | 100 | 100 |
| Conversion/wt % | 66.83 | 66.75 | 65.65 | 65.29 | 68.33 | 72.84 | 73.01 |
| Coke selectivity/wt % | 6.54 | 6.88 | 6.52 | 12.76 | 11.14 | 8.44 | 8.25 |
| Light oil yield/wt % | 70.87 | 71.99 | 70.87 | 58.72 | 63.16 | 68.07 | 67.96 |
| Total liquid yield/wt % | 86.74 | 87.64 | 86.61 | 75.58 | 78.49 | 84.1 | 84.5 |
| Diesel-to-gasoline ratio | 0.57 | 0.60 | 0.60 | 0.52 | 0.44 | 0.38 | 0.39 |

It can be seen from Table 5A that the catalytic cracking catalyst provided in the present application shows a significantly lower coke selectivity, significantly higher liquid yield, significantly higher light oil yield, higher diesel oil yield, higher diesel-to-gasoline ratio, and higher heavy oil conversion activity.

In the above description, the concept of the present application has been described with reference to the embodiments. However, it will be understood by those skilled in the art that various modifications and changes can be made without departing from the scope of the present application defined in the appended claims. Accordingly, the description and drawings should be regarded as illustrative rather than limiting, and all such modifications and changes are covered by the present application.

It is to be understood that some of the features described separately in a plurality of embodiments for the sake of clarity may also be provided as a combination in a single embodiment. Conversely, a plurality of different features that are described in a single embodiment for the sake of brevity may also be provided separately or in any sub-combination in different embodiments.

The invention claimed is:

1. A modified Y-type molecular sieve, having a rare earth oxide content of about 4% to about 11% by weight, a magnesium oxide content of about 0.1% to about 4% by weight, a sodium oxide content of about 0.3% to about 0.8% by weight, a total pore volume of about 0.33 mL/g to about 0.39 mL/g, a percentage of a pore volume of secondary pores having a pore size of 2-100 nm to the total pore volume of the modified Y-type molecular sieve of about 10% to about 30%, a lattice constant of about 2.440 nm to about 2.455 nm, a percentage of non-framework aluminum content to the total aluminum content of the modified Y-type molecular sieve of no more than about 20%, and a lattice collapse temperature of not lower than about 1045° C., wherein the modified Y-type molecular sieve has a framework structure of zeolite Y.

2. The modified Y-type molecular sieve according to claim 1, wherein the modified Y-type molecular sieve has a percentage of the pore volume of secondary pores having a pore size of 2-100 nm to the total pore volume of about 15-25%.

3. The modified Y-type molecular sieve according to claim 1, wherein the modified Y-type molecular sieve has a percentage of non-framework aluminum content to the total aluminum content of about 13-19%, and a framework silica-alumina ratio of about 7 to about 14 calculated on the basis of $SiO_2/Al_2O_3$ molar ratio.

4. The modified Y-type molecular sieve according to claim 1, wherein the modified Y-type molecular sieve has a lattice collapse temperature of about 1045-1075° C.

5. The modified Y-type molecular sieve according to claim 1, wherein the magnesium oxide content is from about 0.5% to about 3% by weight.

6. The modified Y-type molecular sieve according to claim 1, wherein the modified Y-type molecular sieve shows a relative crystallinity retention of about 30% or more after aging at 800° C. under atmospheric pressure in 100% steam atmosphere for 17 hours.

7. The modified Y-type molecular sieve according to claim 1, wherein the modified Y-type molecular sieve has a relative crystallinity of about 55% to about 68%.

8. The modified Y-type molecular sieve according to claim 1, wherein the modified Y-type molecular sieve has a rare earth oxide content of about 4.5% to about 10% by weight, a sodium oxide content of about 0.4% to about 0.6% by weight, a lattice constant of 2.442-2.451 nm, and a framework silica-alumina ratio of about 8.5 to about 12.6 calculated on the basis of $SiO_2/Al_2O_3$ molar ratio.

9. A method for the preparation of a modified Y-type molecular sieve according to claim 1, comprising the steps of:

(1) contacting a NaY molecular sieve with a rare earth salt solution for ion-exchange reactional to obtain a Y type molecular sieve containing rare earth elements and having a reduced sodium oxide content;

(2) calcining the Y-type molecular sieve obtained in the step (1) at a temperature of about 350-480° C. in an atmosphere containing about 30 vol % to about 90 vol % of steam for about a time of 4.5 hours to about 7 hours to obtain a Y-type molecular sieve having a reduced lattice constant;

(3) contacting and reacting the Y-type molecular sieve obtained in the step (2) with gaseous silicon tetrachloride to obtain a high-silica ultra-stable Y-type molecular sieve under the following conditions: a weight ratio of $SiCl_4$:the Y-type molecular sieve on a dry basis of about 0.1:1 to about 0.7:1, a reaction temperature of about 200° C. to about 650° C., and a reaction time of about 10 minutes to about 5 hours; and (4) subjecting the high-silica ultra-stable Y-type molecular sieve obtained in the step (3) to modification with a magnesium compound to obtain the modified Y-type molecular sieve.

10. The method according to claim 9, wherein the Y-type molecular sieve obtained in the step (1) has a lattice constant of about 2.465-2.472 nm, and a sodium oxide content of no more than about 9.5 wt %.

11. The method according to claim 9, wherein the Y-type molecular sieve obtained in the step (1) has a rare earth content of about 4.5% to about 13% by weight on the basis of $RE_2O_3$, a sodium oxide content of about 5-9.5% by weight, and a lattice constant of about 2.465-2.472 nm.

12. The method according to claim 9, wherein, in the step (1), the ion-exchange reaction of the NaY molecular sieve with the rare earth solution is carried out under the following conditions: a weight ratio of NaY molecular sieve:rare earth salt:$H_2O$ of about 1:0.01-0.18:5-15, an ion-exchange temperature of about 15-95° C., and an ion-exchange time of about 30-120 minutes.

13. The method according to claim 9, wherein, in the step (2), the calcination temperature is about 380-460° C., the calcination atmosphere contains about 40-80% steam, and the calcination time is about 5-6 hours.

14. The method according to claim 9, wherein the Y-type molecular sieve having a reduced lattice constant obtained in the step (2) has a lattice constant of about 2.450-2.462 nm, and a water content of no more than about 1% by weight.

15. The method according to claim 9, wherein the rare earth salt is rare earth chloride, rare earth nitrate, or a mixture thereof, and the magnesium compound is magnesium chloride, magnesium nitrate, or a mixture thereof.

16. The method according to claim 9, wherein the modification with the magnesium compound of the step (4) comprises: adding the high-silica ultra-stable Y-type molecular sieve to a solution containing a magnesium salt at a weight ratio of water to the high-silica ultra-stable Y-type molecular sieve of about 1-6, a weight ratio of the magnesium salt on the basis magnesium oxide to the high-silica ultra-stable Y-type molecular sieve of about 0.001-0.04; stirring at about 5-50° C. for about 10-120 minutes, adding ammonia water to adjust the pH of the solution to about 7.5-10, then filtering to obtain a filter cake and subjecting the filter cake to calcination at about 500-650° C. for at least about 1 hour, to obtain the modified Y-type molecular sieve.

17. A catalytic cracking catalyst, comprising the modified Y-type molecular sieve according to claim 1.

18. The catalytic cracking catalyst according to claim 17, wherein the catalyst comprises about 10% to about 50% by weight, on a dry basis, of the modified Y-type molecular sieve, about 10% to about 40% by weight on the basis of alumina of an alumina binder, and about 10% to about 80% by weight, on a dry basis, of clay.

19. The catalytic cracking catalyst according to claim 17, wherein the catalyst comprises about 10% to about 50% by weight, on a dry basis, of the modified Y-type molecular sieve, about 2% to about 40% by weight on a dry basis of an additive-containing alumina and about 10% to about 80% by weight, on a dry basis, of clay; wherein on a dry basis and based on the weight of the additive-containing alumina, the additive-containing alumina comprises about 60% to about 99.5% by weight of alumina and about 0.5% to about 40% by weight of an additive, wherein the additive is one or more selected from the group consisting of compounds containing alkaline earth metal, lanthanide metal, silicon, gallium, boron, phosphorus, and mixtures thereof.

20. The catalytic cracking catalyst according to claim 19, wherein the catalyst comprises about 25-40% by weight, on a dry basis, of the modified Y-type molecular sieve, about 2-20% by weight on a dry basis of an additive-containing alumina, about 5-30% by weight on a dry basis of an alumina binder, and about 30-50% by weight on a dry basis of clay.

\* \* \* \* \*